(12) United States Patent
Darling et al.

(10) Patent No.: US 9,807,154 B2
(45) Date of Patent: Oct. 31, 2017

(54) SCALABLE LOGGING CONTROL FOR DISTRIBUTED NETWORK DEVICES

(71) Applicant: Lenovo Enterprise Solutions (Singapore) Pte. Ltd., Singapore (SG)

(72) Inventors: Glen Darling, San Jose, CA (US); Roberto H. Jacob Da Silva, Oak Park, CA (US)

(73) Assignee: Lenovo Enterprise Solutions (Singapore) Pte, Ltd., Singapore (SG)

( * ) Notice: Subject to any disclaimer, the term of this patent is extended or adjusted under 35 U.S.C. 154(b) by 238 days.

(21) Appl. No.: 14/498,937

(22) Filed: Sep. 26, 2014

(65) Prior Publication Data

US 2016/0094620 A1 Mar. 31, 2016

(51) Int. Cl.
*G06F 15/16* (2006.01)
*H04L 29/08* (2006.01)
(52) U.S. Cl.
CPC .............. *H04L 67/10* (2013.01); *H04L 67/22* (2013.01)
(58) Field of Classification Search
CPC ...................................................... H04L 67/10
USPC ....... 709/203, 204, 206, 217, 219, 223, 224, 709/226, 228, 231, 232, 238; 714/15; 725/107
See application file for complete search history.

(56) References Cited

U.S. PATENT DOCUMENTS

| | | | |
|---|---|---|---|
| 5,682,328 A * | 10/1997 | Roeber | G06F 11/3024 702/187 |
| 6,182,119 B1 | 1/2001 | Chu | |
| 6,738,832 B2 * | 5/2004 | Burr | G06F 11/3093 709/221 |
| 7,120,685 B2 | 10/2006 | Ullmann et al. | |
| 7,155,514 B1 | 12/2006 | Milford | |
| 7,453,871 B2 | 11/2008 | Josyula et al. | |
| 7,478,128 B2 * | 1/2009 | Helmstetter | G05B 23/0267 709/204 |
| 7,685,143 B2 | 3/2010 | Tsui et al. | |
| 7,743,029 B2 | 6/2010 | Frey et al. | |
| 8,032,489 B2 | 10/2011 | Villella et al. | |

(Continued)

OTHER PUBLICATIONS

"Arub Networks Unveils Arubaos 3.1 New OS/Application Engine," LAN Product News, Apr. 1, 2007, pp. 1-4.

(Continued)

*Primary Examiner* — Quang N Nguyen
(74) *Attorney, Agent, or Firm* — Zilka-Kotab, P.C.

(57) ABSTRACT

In one embodiment, a method includes receiving one or more logging events from a client application during a period of time when a logging control configuration has not been fully applied, handling any logging events directed toward at least one of a library code and one or more client applications by storing information relating to an originator of the logging events in a log file and dispatching the logging events directed toward at least one of the library code and the one or more client applications to a syslog daemon, and en-queuing all other logging events for later processing in a circular buffer maintained in non-persistent memory of a shared memory for later retrieval, wherein the other logging events are en-queued for later processing regardless of a severity indicated for any individual logging events. Other methods, systems, and computer program products are described according to more embodiments.

20 Claims, 13 Drawing Sheets

(56) References Cited

U.S. PATENT DOCUMENTS

| | | | |
|---|---|---|---|
| 8,271,996 B1* | 9/2012 | Gould | G06F 9/542 |
| | | | 719/312 |
| 8,543,694 B2 | 9/2013 | Petersen et al. | |
| 8,560,889 B2* | 10/2013 | Behrendt | G06F 9/542 |
| | | | 714/15 |
| 8,806,550 B1* | 8/2014 | Chan | H04N 17/004 |
| | | | 725/107 |
| 9,390,118 B2* | 7/2016 | Surlaker | G06F 17/30368 |
| 2004/0078695 A1* | 4/2004 | Bowers | G06F 11/0781 |
| | | | 714/39 |
| 2006/0161816 A1 | 7/2006 | Gula et al. | |
| 2007/0136278 A1* | 6/2007 | Grazioli | G06F 9/4435 |
| 2010/0299366 A1* | 11/2010 | Stienhans | G06F 9/5072 |
| | | | 707/803 |
| 2011/0270957 A1 | 11/2011 | Phan et al. | |
| 2012/0246303 A1* | 9/2012 | Petersen | G06F 17/30185 |
| | | | 709/224 |
| 2014/0068328 A1* | 3/2014 | Jain | G06F 11/1471 |
| | | | 714/15 |
| 2016/0041894 A1* | 2/2016 | Reid, III | G06F 11/3636 |
| | | | 714/45 |

OTHER PUBLICATIONS

Turner et al., "Supercharging PlanetLab—A High Performance, Multi-Application, Overlay Network Platform," SIGCOMM'07, Aug. 27-31, 2007, pp. 1-12.

* cited by examiner

SCALABLE LOGGING CONTROL FOR DISTRIBUTED NETWORK DEVICES

BACKGROUND

The present invention relates to distributed networking, and more particularly, this invention relates to the configuration and control of standard message logging services as they operate in networking devices.

Many of the networking devices (such as switches, routers, etc.) make use of standard message logging services (such as the syslog protocol as defined in RFC 5424) to communicate with other devices in the network. However, current implementations do not provide the flexibility, scalability, or configurability necessary for modern networking applications. Accordingly, it would beneficial to have a distributed logging storage solution that is scalable and configurable.

SUMMARY

In one embodiment, a system includes a master node controller that includes a processor and logic integrated with and/or executable by the processor, the logic being configured to receive one or more logging events from a client application during a period of time when a logging control configuration has not been fully applied, handle any logging events directed toward at least one of a library code and one or more client applications by storing information relating to an originator of the logging events in a log file and dispatching the logging events directed toward at least one of the library code and the one or more client applications to a syslog daemon, and en-queue all other logging events for later processing in a shared memory.

In another embodiment, a method includes receiving one or more logging events from a client application during a period of time when a logging control configuration has not been fully applied, handling any logging events directed toward at least one of a library code and one or more client applications by storing information relating to an originator of the logging events in a log file and dispatching the logging events directed toward at least one of the library code and the one or more client applications to a syslog daemon, and en-queuing all other logging events for later processing in a circular buffer maintained in non-persistent memory of a shared memory for later retrieval, wherein the other logging events are en-queued for later processing regardless of a severity indicated for any individual logging events.

In another embodiment, a computer program product includes a computer readable storage medium having program instructions embodied therewith, the program instructions being executable by a master node controller to cause the master node controller to receive one or more logging events from a client application during a period of time when a logging control configuration has not been fully applied, handle any logging events directed toward at least one of a library code and one or more client applications by storing information relating to an originator of the logging events in a log file and dispatching the logging events directed toward at least one of the library code and the one or more client applications to a syslog daemon, create and/or allocate a circular buffer maintained in non-persistent memory of a shared memory using at least one of the logging control application and the one or more client applications, wherein the shared memory is accessible to the logging control application and the one or more client applications, and wherein the shared memory is owned by the logging control application, and en-queue all other logging events for later processing in the circular buffer of the shared memory for later retrieval regardless of a severity indicated for any individual logging events.

Other aspects and embodiments of the present invention will become apparent from the following detailed description, which, when taken in conjunction with the drawings, illustrate by way of example the principles of the invention.

DETAILED DESCRIPTION

Figure 1:
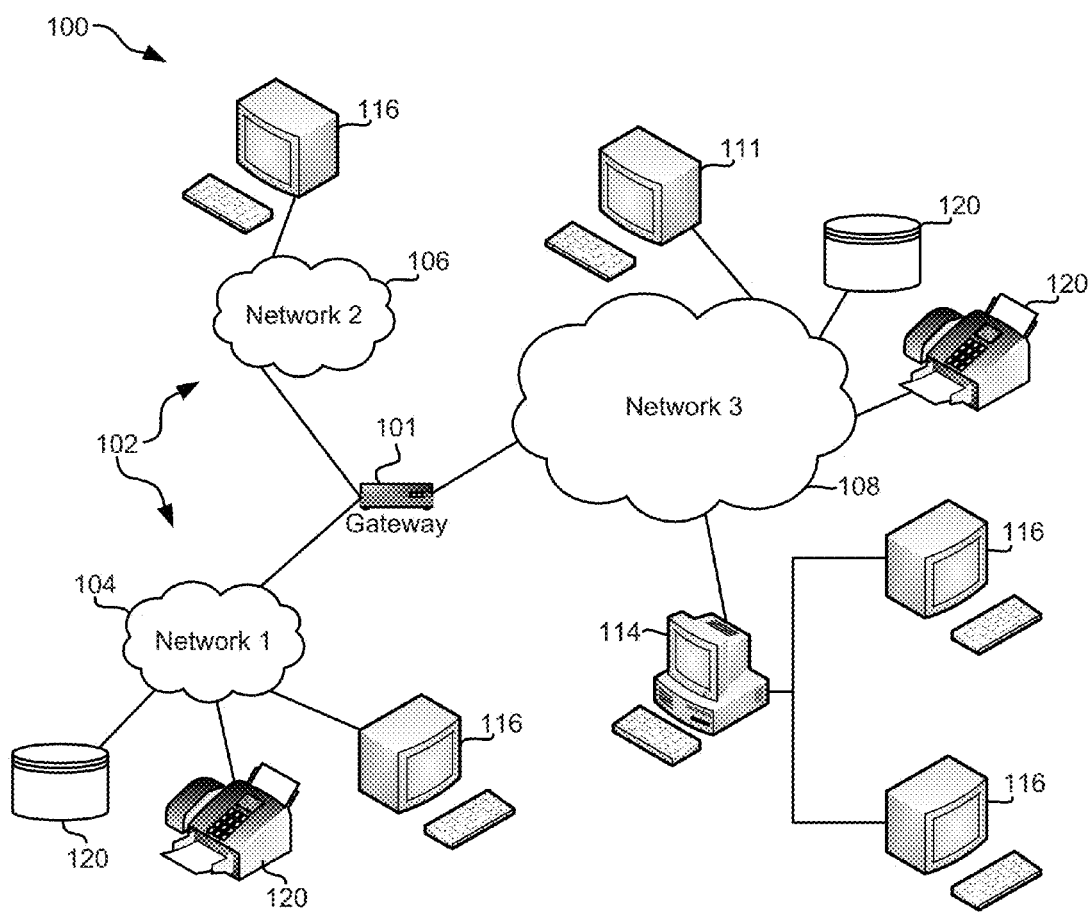
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified.

In one general embodiment, a system includes a master node controller that includes a processor and logic integrated with and/or executable by the processor, the logic being configured to receive one or more logging events from a client application during a period of time when a logging control configuration has not been fully applied, handle any logging events directed toward at least one of a library code and one or more client applications by storing information relating to an originator of the logging events in a log file and dispatching the logging events directed toward at least one of the library code and the one or more client applications to a syslog daemon, and en-queue all other logging events for later processing in a shared memory.

In another general embodiment, a method includes receiving one or more logging events from a client application during a period of time when a logging control configuration has not been fully applied, handling any logging events directed toward at least one of a library code and one or more client applications by storing information relating to an originator of the logging events in a log file and dispatching the logging events directed toward at least one of the library code and the one or more client applications to a syslog daemon, and en-queuing all other logging events for later processing in a circular buffer maintained in non-persistent memory of a shared memory for later retrieval, wherein the other logging events are en-queued for later processing regardless of a severity indicated for any individual logging events.

In another general embodiment, a computer program product includes a computer readable storage medium having program instructions embodied therewith, the program instructions being executable by a master node controller to cause the master node controller to receive one or more logging events from a client application during a period of time when a logging control configuration has not been fully applied, handle any logging events directed toward at least one of a library code and one or more client applications by storing information relating to an originator of the logging events in a log file and dispatching the logging events directed toward at least one of the library code and the one or more client applications to a syslog daemon, create and/or allocate a circular buffer maintained in non-persistent memory of a shared memory using at least one of the logging control application and the one or more client applications, wherein the shared memory is accessible to the logging control application and the one or more client applications, and wherein the shared memory is owned by the logging control application, and en-queue all other logging events for later processing in the circular buffer of the shared memory for later retrieval regardless of a severity indicated for any individual logging events.

To begin with, some terminology is presented for better understanding of the concepts presented herein. System Log ("Syslog") is a standard for computer data logging, which separates the software that generates messages, from the system that stores the messages and the software that reports and analyzes the messages. Syslog was developed in the early 1980's as a part of sendmail (according to RFC 5424). Syslog runs over user datagram protocol (UDP) but is sometimes implemented over TCP (not often used). It is the defacto standard for logging on almost every computing platform other than Microsoft Windows.

A console device or console as used herein denotes a special terminal line playing the role of a primary terminal line. A console port is primarily used for local system access through a console terminal. Usually the console device is assigned the file descriptor /dev/console.

Each node in a cluster has a serial console port. An external laptop and/or PC connected to that port may act as a terminal to provide access to a Linux shell that runs in the context of a local CPU. This means that the local operating system running on that CPU is provided access to that port through a computer terminal (tty device). The user may also connect to the master node through the out-of-band management port. The communication occurs over IP using an established protocol, such as Telnet, secure shell (SSH), etc. In this case, even though each node has its own out-of-band management port, all of them are terminated in the master node. This means that all IP packets exchanged between the external host machine (e.g., laptop and/or PC) and any of the physical nodes that are part of the cluster are actually processed by the TCP/IP stack of the platform software on the master node. From the perspective of that master node, the external host may be accessed through a Telnet (vty) device. Then, once the user is connected to the master node (console connection or through Telnet/SSH), it is possible to establish a connection with a remote node within the cluster using Telnet or SSH. In this case, the screen actually used as output corresponds to the external host's screen regardless of how that host is logically connected to the master node. From the point of view of the remote node's CPU, the device representing this "screen" may be accessed through a vty session as well. Note that this Telnet/SSH session provides a way for the user to remotely gain access to any node in the cluster which otherwise would not be reachable directly (unless a host is directly connected to the serial console port of that particular node).

A node is a hardware device that includes a controller (such as a CPU, ASIC, FPGA, etc.), networking devices (where the actual switching and/or routing of data takes place), and other resources, such as runtime memory (e.g., DRAM, etc.) and persistent storage (e.g., Flash memory, DRAM, etc.).

A node controller is the CPU where the firmware/software that controls the switching hardware is executed.

A cluster is a group of distributed but centrally managed nodes that provide some combination of network, computing, storage, and application services, among other possible functions.

In computing, inter-process communication (IPC) is a set of methods for the exchange of data among multiple threads in one or more processes. Processes may be running on one or more computers or devices connected by a network. IPC methods are divided into methods for message passing, synchronization, shared memory, and remote procedure calls (RPCs). The method of IPC used may vary based on the bandwidth and latency of communication between the threads, and the type of data being communicated.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM zIOS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
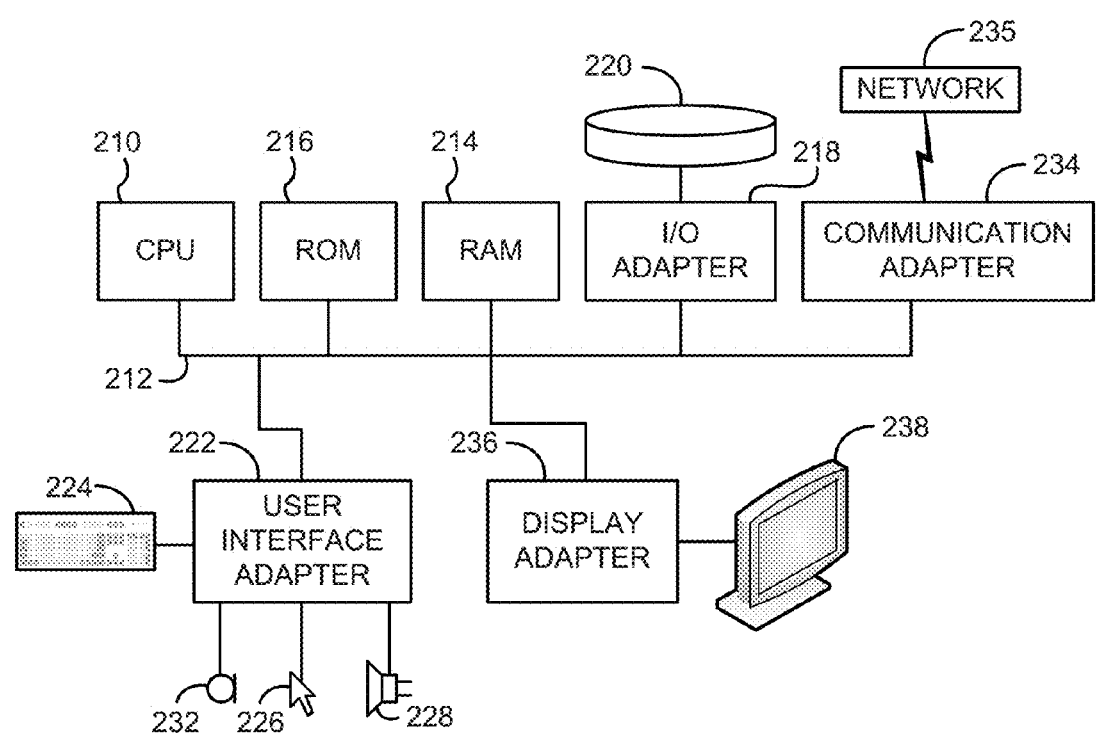
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Currently, methods of achieving interconnectivity between a large number of layer 2 ports rely on having numerous discrete switches each running spanning tree protocol (STP) or transparent interconnect of lots of links (TRILL). Unfortunately, by using discrete switches, a lookup needs to be performed using a lookup table at each hop between two of the discrete switches, which not only adds latency to the process, but also makes the process latency unpredictable as the network evolves and changes.

On the other hand, distributed switches relying on a cell-based fabric interconnect have an advantage of providing predictable, low latency for setups in which interconnectivity between a large number of ports is desired. A distributed switch appears to be a single, very large switch, with the single ingress lookup specifying the index needed to traverse the network. The edge facing switches are interconnected using cell-based Clos fabrics, which are wired in a fixed fashion and rely on the path selection made at the ingress.

Unfortunately, as the number of ports in a distributed switch grows, software that manages the network must struggle to accommodate the increased number of link up and/or link down events (link events) and processing. Control protocols, like STP and intermediate system to intermediate system (ISIS), will see a large number of link events, which will stress their convergence times if they continue to exist as monolithic elements.

Figure 3:
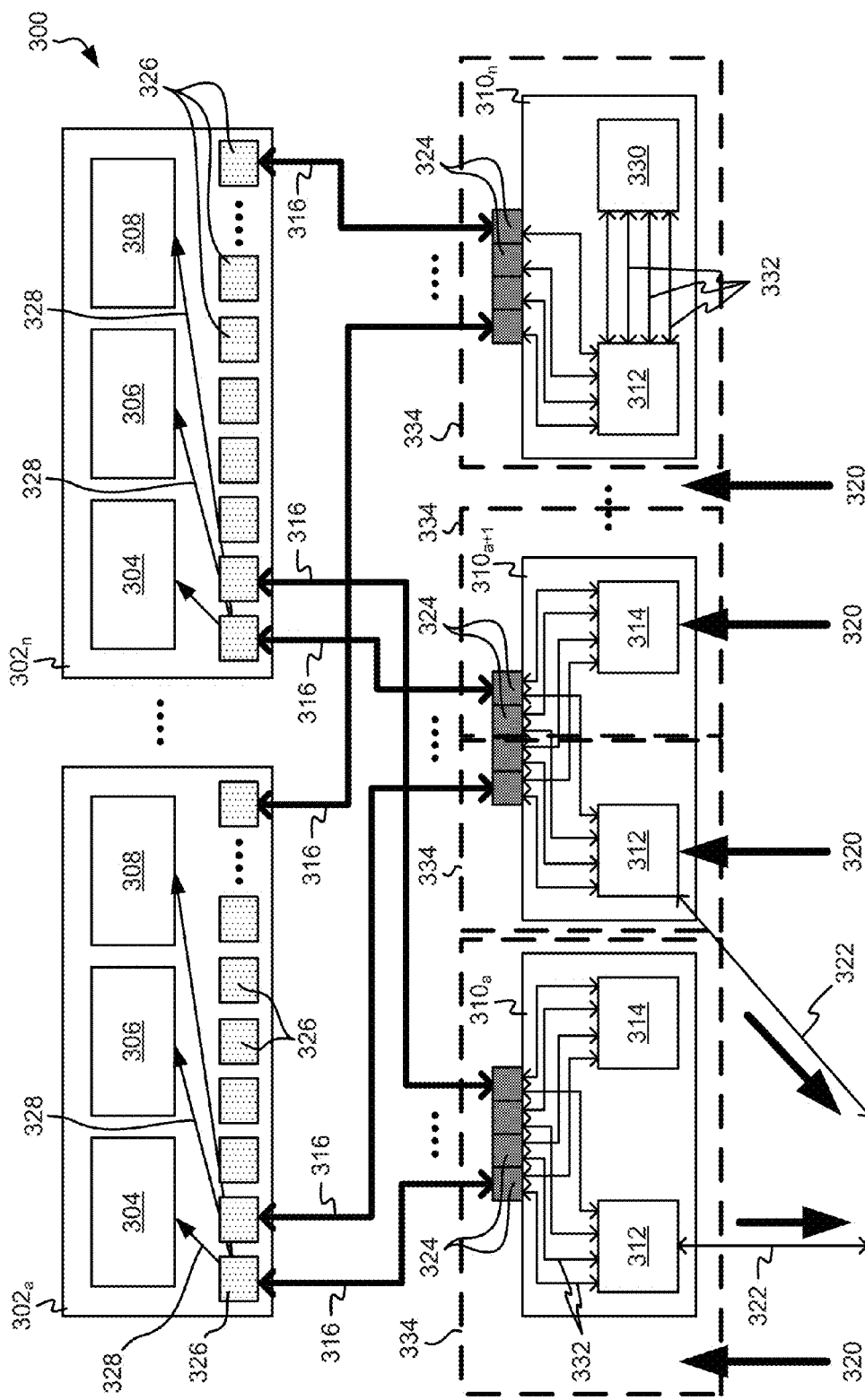
FIG. 3 is a simplified diagram of a distributed switch system, according to one embodiment.

Now referring to FIG. 3, a distributed switch system 300 is shown according to one embodiment. The distributed switch system 300 may include a plurality of switch fabric controllers (SFCs) $302_a$-$302_n$ and a plurality of distributed line cards (DLCs) $310_a$-$310_n$. The system 300 is formed by having a plurality of DLCs $310_a$-$310_n$ directly connected to SFCs $302_a$-$302_n$ via connections 316. A plurality of network data packets or control protocol data units (PDUs) 320, for example PDUs from various network ports, may be received by the DLCs $310_a$-$310_n$, possibly numbering in the billions. In addition, the DLCs $310_a$-$310_n$ may be in communication with the meta-controller 318 via a plurality of connections 322 to exchange information, data, statuses, etc.

According to various embodiments, the connections 316 may be a bundle of 12 links each with 10G to 11G bandwidth. The bundle may use a standard connector form factor. In more embodiments, the plurality of connections 322 may comprise any suitable connection, such as peripheral component interconnect express (PCIe), gigabit Ethernet, XAUI, etc.

In one embodiment, for example, the meta-controller 318 may be configured with logic capable of receiving incoming data traffic, controlling PDU traffic, and processing all the packets for the control plane of the distributed switch system 300.

In various embodiments, each SFC $302_a$-$302_n$ may be further characterized as described below. First, each SFC $302_a$-$302_n$ may include a plurality of module boards 304, 306, 308. In one embodiment, the module boards 304, 306, 308 may include any suitable module board according to the understanding of the skilled artisan reading the present descriptions. The SFCs $302_a$-$302_n$ may include a plurality of ports (or interfaces) 326, with each SFC port 326 being in communication with each of the module boards 304, 306, 308 via connections 328. Moreover, the SFC ports 326 may be capable of interfacing, for example, with DLCs $310_a$-$310_n$ via connections 316.

As shown in FIG. 3, each SFC $302_a$-$302_n$ includes 32 of such SFC ports 326, but of course other embodiments may include more or less SFC ports 326 for each SFC $302_a$-$302_n$, such as 8, 16, 64, 128, etc. In one particular embodiment, for example, the SFCs $302_a$-$302_n$ include 256 of such SFC ports 326. In any event, each SFC/DLC includes at least n ports/interfaces, respectively, where n is the number of DLCs $310_a$-$310_n$ included in the distributed switch system 300.

Additionally, the DLCs $310_a$-$310_n$ may be further characterized as follows. Each DLC (except the final DLC $310_n$ which is described immediately below, according to one approach) may include a plurality of switching complexes 312, 314, in one embodiment, such as a plurality of BROADCOM Corporation BCM88650 switches. In one approach, the switching complexes may be Ethernet switching complexes. In addition to the switching complexes 312, 314, each DLC $310_a$-$310_n$ includes a plurality of ports/interfaces 324 capable of facilitating communications between the DLC $310_a$-$310_n$ and any connected peripheral device or component, such as but not limited to one or more SFCs $302_a$-$302_n$, in one approach. In one embodiment, each switching complex 312, 314 may be in communication with each of the DLC ports 324 via independent connections 332. Therefore, according to one embodiment, each switching complex 312, 314 may include n connections 332, one for each of the n DLC ports 324 in the DLCs $310_a$-$310_n$.

Further still, the final DLC (end of rack, top-of-rack, etc.) in any given DLC series, denoted by DLC $310_n$, may have properties unique from the other DLCs $310_a$-$310_{n-1}$ in the series. In particular, whereas DLCs $310_n$-$310_{n-1}$ include a pair of switching complexes 312, 314, the final DLC $310_n$ may alternatively contain a single switching complex 312 in communication with each of the DLC ports 324 via individual connections 332 and a network processing unit (NPU) complex 330 in communication with the switching complex 312 via connections 332, according to one approach. In operation, NPU complex 330 may provide virtual appliance and/or application services, such as firewall services, IPS, IDS, VPN, encryption, etc., as would be understood by one having ordinary skill in the art upon reading the present descriptions.

In one embodiment, connections 316 may be established between DLC ports 324 in the DLCs $310_a$-$310_n$ and SFC ports 326 in the SFCs $302_a$-$302_n$. Moreover, the DLC ports 324 may be SERDES interfaces, and each connection 316 may be characterized as including about 12 SERDES interfaces in DLCs $310_a$-$310_{n-1}$, whereas in DLC $310_n$ each connection 316 may be characterized as including about 6 SERDES interfaces, in one approach.

Notably, each of the SFCs $302_a$-$302_n$ is in communication with each of the DLCs $310_a$-$310_n$ via a single connection 316. Connectivity may be achieved between all SFCs and DLCs according to any connection architecture known in the art. For example, as shown in FIG. 3, connectivity between SFC ports 326 and DLC ports 324 is achieved according to the following relationship, $$SFC_{(S,p)} \leftrightarrow DLC_{(D,i)}; \text{ where } S=i \text{ and } p=D,$$

where S represents the position of the SFC in the SFC series $302_a$-$302_n$, D represents the position of the DLC in the DLC series $310_a$-$310_n$, p represents the port position within the given SFC, i represents the ports position within the given DLC, and $\leftrightarrow$ represents the connection between the two.

In other words, the first port 326 of the first SFC $302_1$ is in communication with the first port 324 of the first DLC $310_i$ via a connection 316. Similarly, the second port 326 of the first SFC $302_i$ [SFC(1,2)] is in communication with the first port 324 of the second DLC $310_{a+1}$ [DLC(2,1)] via a connection 316. This connectivity pattern continues until reaching the last ($n^{th}$) port 326 on the first SFC $302_a$, which is in communication with the first port 324 of the last ($n^{th}$) DLC $310_n$. The second connection of the pair follows an inverse pattern, where the last ($n^{th}$) port 326 of the last ($n^{th}$) SFC $302_n$ is in communication with the last ($n^{th}$) port 324 of the last ($n^{th}$) DLC $310_n$. Furthermore, the penultimate (n-$1^{th}$) port 326 of the last ($n^{th}$) SFC $302_n$ is in communication with the last ($n^{th}$) port 324 of the penultimate DLC $310_{n-1}$. This connectivity pattern continues until reaching the last ($n^{th}$) port 326 of the first SFC $302_a$, which is in communication with the first ($a^{th}$) port 324 of the last DLC $310_n$.

Moreover, the distributed switch system 300 shown in FIG. 3 includes a plurality of SFCs $302_a$-$302_n$ and a plurality of DLCs $310_a$-$310_n$; specifically, the distributed switch system 300 depicts two SFCs and three DLCs. However, as one feature of the distributed switch system 300, the number of SFCs and DLCs may be scaled to achieve any performance characteristics, as desired. In FIG. 3, scalable features include the number of SFCs and the number of DLCs, as well as the number of ports (or interfaces) included on each SFC and/or DLC, as indicated by the ellipsis shown in FIG. 3.

The configuration and control of standard message logging services (e.g., the syslog protocol as defined in RFC 5424) as they operate in networking devices (e.g., Ethernet switches, routers, etc.) are not capable of being handled with a central repository or control scheme in typical network architectures. Therefore, in one embodiment, a logging control software application is proposed for networking devices with generic architectures which still meets extreme requirements in terms of scalability, flexibility, and platform software independence.

This proposed solution has several challenges to overcome, specifically distributed logging storage, flexible start-up logging configuration parsing, and logging co-existence in devices with decoupled networking and platform software.

The distributed logging storage issue stems from networking devices possibly having distinct implementations in the form of chassis-based/multi-slot devices, stackable devices, modular devices (e.g., single chip pizza boxes), etc. Beside the various architectural differences of these device types, the complexity of the control software and the scale or dimension of such devices has increased significantly in recent years. As a result of the complexity and the inevitable software bugs that increase with complexity, a robust logging system is beneficial, which is configured to provide precious troubleshooting information when issues arise. In light of the scale of the devices, a main problem may be represented as being able to store as much information as possible employing the storage space available on the platform in the most efficient fashion as far as optimally using the available storage space, while still providing logging information. The most common implementation depends on the type of architecture used, as discussed in more detail below.

On monolithic architectures, the problem is trivial, and therefore there is only one module and this module has a local storage device (e.g., Flash).

Likewise, on stackable products, each networking device that is a member of the stack has its own local storage device. In this case, the logging events related to each stack member device may be stored locally. An alternate approach involves all stack members actually forwarding their logs or logging information to a master device (usually one of the stack members is chosen as the management and control entry point and called the "master").

In the case of chassis-based architectures, the centralized approach includes a controller card (typically with a back-up controller for redundancy) and a number of line cards. The most common design involves only the controller cards having local storage devices (e.g., Flash), whereas the line cards do not have any storage. On the other hand, some products do have storage devices on all line cards, in addition to the controller's Flash memory devices. Regardless of the presence of Flash memory devices on the line cards, almost all implementations are based on a centralized logging paradigm. Here, all events logged by each individual line card are always forwarded to the active chassis controller.

The chassis-based products as well as unified fabric products (and even some stackable implementations) use the centralized logging approach. This approach has two serious limitations. First, it is not scalable in terms of storage space. When the number of line cards or individual modules that compose the networking device increases, as well as the size of the configuration, the system may produce a high volume of logging information. Since logging systems usually work based on rotation of files (there is a limit on the number and size of files used to store the events), the ability to troubleshoot problems is lost when the problem's root cause is associated to an event that occurred recently (not too long ago in the past). In other words, the time span of the available logging data is reduced. This may make it very hard to debug problems, especially at the customer site where access to a live network may be difficult or impossible to obtain.

The flexible start-up logging configuration parsing issue is discussed next. Although the standard message logging systems provide basic capabilities, networking device vendors invariably provide the user with the ability to customize parameters, such as the format of the messages, the contents of the messages, which events must be logged, which software components are allowed to log events, the destination of the logs (e.g., a log file, console, external servers, terminal sessions like Telnet/SSH, etc.), etc.

The ability to configure these parameters is what is referred to as configuration control of the logging services. In many networking devices, these settings are stored in start-up configuration files encoded as ASCII text files containing a list of Command Line Interface (CLI) commands. Other systems may employ different ways to encode the data (e.g., XML). Other devices, in turn, may acquire the start-up configuration from external sources (e.g., management systems via simple network management protocol (SNMP)). In addition to the several techniques used to store the start-up configuration data, a wide variety of methods are available for the device's control software to employ to parse this start-up configuration and send it to the individual software applications. As a result of this complex set of variables, many times events need to be processed that are logged by software applications even before the start-up configuration settings related to the logging services have been applied to the logging control software, and therefore are not logged or are not logged properly.

In order to describe how this problem is normally addressed, two scenarios are considered which are strongly related to the architecture of the network software regarding how the initial (start-up) configuration is parsed and distributed to the control applications.

Some systems parse the configuration of each application one at a time, as soon as each application is started. For example, assuming three applications A, B, and C, the system will start the process related to application A first. At some point, some module (e.g., a configuration manager component) will read the start-up configuration from the appropriate repository and send that configuration to application A, which will handle the settings and either apply them immediately or simply store the information and wait for a further system event. Then, the configuration manager will repeat the same processing for application B, and then application C. Some systems have a solid design and present all configuration commands (regardless of the source, e.g., start-up configuration, runtime CLI, SNMP, etc.) to the applications using some unified interface.

Other systems may operate in a different fashion. They may first start all applications A, B, and C. Then, only after all applications are started, they may proceed to parse the configuration and distribute it to each individual application A, B, and C.

Regardless of the type of architecture used, there is one commonality. The system will always try to start the application that configures and controls the logging services as early as possible. Note also that the logging system itself is usually operational even before the first networking application is up and running. This is true in many systems where logging is part of the operating system and, therefore, initialized even before the higher layer networking device software is even started.

There are, however, drawbacks. Regardless of the architecture and when the start-up configuration is parsed and distributed, all these implementations have a flaw. Invariable, for every system, there is always some important system application that must be started before the logging control application is initialized or configured. Note that the logging application itself always has some configurable parameters that are specific to it, and, hence, not related to any of the other generic applications. In some systems, this application may be called the system manager, chassis supervisor, start-up controller, or some other name. After it is started, at least that application needs to log events. In the case of an architecture where all applications are started before parsing any configuration, the issue is aggravated. In this instance, there may be tens of applications being started, each of which produces logging messages, before the logging control application is configured. Some of the options that have been implemented in other systems include the following.

1) changing the architecture to force the parsing of the configuration as early as possible, which may not be feasible or acceptable depending on the product;
2) not logging those events that occur early, i.e., ignore them, and if a bug occurs during that stage, there is no way of debugging the problem;
3) logging the events that occur before the logging controller is configured, but employing some default settings for the logging configuration which results in logging, before the logging controller is configured, and logging after the logging controller is configured being inconsistent.
4) having the logging controller proceed to parse the start-up configuration on its own, so that it does not wait for the "official" settings from the configuration manager.

The last proposition has many drawbacks. First, the logging control software needs to be aware of the location and format of the star-up configuration. However, depending on the design of the system, the location of the start-up configuration may be unknown by the time the logging controller starts. Also, the format may change over time. Although these challenges are theoretically possible to overcome, a hacked design would result where the formal architecture of the system is designed around and some entity would be responsible for managing the start-up configuration and providing a unified view of start-up and runtime configuration events regardless of the source management entity (CLI, SNMP, Web Management, etc.).

None of these solutions really solves the problem for most use cases. Besides, a solution that will work in one type of architecture may not be applicable to another architecture based upon a different start-up configuration design.

Now the logging co-existence in devices with decoupled networking and platform software issue is discussed. Many complex networking devices, especially those based on stacking technologies or unified fabrics, are architecturally split into two major layers of software. At the lower level, there is the platform software, responsible for bringing up the motherboard, topology discovery, master election, and fabric configuration. At the higher level, there is the actual networking software represented by protocols and applications that provide Management Interface, Layer 2, Layer 3, Security, and Multicast services. A key aspect to be considered here is that, in this model, the configuration of control of the logging services naturally falls into the scope of the networking software. The goal of such a design approach is to keep the two layers highly decoupled. The whole idea is that the platform software should be rock solid and bug-less. In reality, this is hardly something that is achievable.

When there are issues in the platform software, it is desirable to acquire as much troubleshooting data as possible (i.e., logging information). A more subtle aspect to be taken into account is that the networking software is actually started only after a lot of the platform software has been executed and performed key operations. Therefore, the following problems remain. A mechanism should be in place for the networking device software to be aware of the events logged by the underlying platform software. In addition, the events logged by the platform software should be reported using the same configuration settings and format used by the higher layer networking software, even those events that were reported by the platform software during the time interval when the networking software was not even running yet.

The only known solution to this issue involves designing two completely separate logging systems: one for the platform software and one for the higher level networking software. Each logging system typically employs a distinct set of CLI (management interface), configuration support, and event format.

Some disadvantages of this solution include that it may be difficult to correlate the sequence of events reported by each logging system as they are not stored on the same repository, the format of the different logging systems may not be uniform either, which makes it harder for automated logging analysis tools to process the data, and the platform software logging is usually not configurable.

In order to overcome all of these issues, a broad logging control application responsible for handling configuration and all aspects of the management interface is provided, in one embodiment. The logging control application is also configured to distribute the settings to all modules within the networking device context, applying these settings to drive the behavior of the standard underlying logging system (e.g., syslog daemon) and implementing a shared library, which is used by applications to report events. The full details of the several functional blocks are provided after an initial description.

In one embodiment, distributed logging storage may be provided such that the logging controller assumes that any device implementation always has one particular module that plays the role of the master of the system and single entry point for management purposes. Also, logging messages may be stored on local non-volatile storage devices (e.g., Flash memory) whenever such devices are available on a given module (e.g., a line card).

In another embodiment, flexible start-up logging configuration parsing may be provided. Whenever a client application logs an event during a period of time when the logging control configuration has not yet been parsed and applied, such as during start-up, restart, etc., the logging controller will proceed by handling the logging events as usual as far as the library code and client application are concerned. For example, the system will store the client process information, list of message descriptions, service state (i.e., enabled/disabled), etc. On the other hand, the logging controller software will not dispatch logged events to the syslog daemon. Instead, these events will be en-queued for later processing (e.g., as soon as the logging service is fully configured) using some implementation of a circular buffer maintained in non-persistent memory (e.g., DRAM). Events will be en-queued regardless of their severity (including debug level events), which causes for an excess amount of logging events being en-queued.

When the logging service ready state is reached, the configuration settings will be known (i.e., which severity is set for each client and also the settings specific to the logging control application itself) and they may then be used to filter which events will actually be re-played to the syslog daemon. However, if that state is never reached, the actual severity settings are never known. In this case, in order to avoid precious data loss, all events will be replayed in the pending buffers after some trigger system event or saved in a dump file in case the system decides to reset.

The shared memory area where the initial logs are stored may be created by the logging control application or by any client application, in various embodiments. Although any client may trigger the creation of this memory, its owner is always the logging control application in one embodiment.

For the logging co-existence in devices with decoupled networking and platform software, the implementation of the solution depends on how the underlying platform software reports and stores logging messages, but the high-level idea may be summarized as follows.

As soon as the logging control application has been fully configured, it retrieves the platform software logs that occurred before the fully configured state has been reached and replays them. When the platform software has its own log repository, the logging control application reads the events from this log repository through an appropriate interface exposed by the platform software. Otherwise, when the platform software does not have a repository on its own, then all events will be stored in the logging control application's shared memory.

All logging events originating from the platform software, and which occur after the logging control application is fully configured, are redirected to the context of networking device software's logging system. The format of the events generated by the platform software is aligned to match the networking software format, so that a common format is presented to the user. The implementation is configured to ensure that no loops of logging events occur in the specific cases where the platform software is also interested in procuring copies of all events or a subset of the events generated by the networking applications.

Although the descriptions provided herein are applicable to a wide range of networking device architectures, a complete description is provided assuming a chassis-based unified fabric product. This description is provided in order to address the most complex scenario.

Sometimes some of the details of the underling platform software are described in order to explain the system interactions related to the logging controller. Nevertheless, the design and implementation of this platform software, including its logging system, is not necessary for the description of the various embodiments of the logging control application included herein. Any generic platform software component may be used.

From a high-level, some of the responsibilities of the logging control application may include: user-initiated functionality configuration, logging data clean-up, logging data visualization, and distribution of configuration to all controllers in the system and configuration of the underlying logging infrastructure (e.g., syslog daemon).

Logged events may be sent to a number of different outputs or destinations, whose behavior may be controlled individually for each type of output, according to one embodiment, including: console, terminal/monitor, log file, and external syslog server, among other possibilities.

In one embodiment, a single log repository per node controller may be implemented as a set of rotating files in Flash memory. Also, syslog verbosity may be provided by standard severity levels: Emergency (0), Alert (1), Critical (2), Error (3), Warning (4), Notice (5), Informational (6) and Debug (7), in one embodiment. In other embodiments, custom severity levels may be established and utilized, depending on desired responses and interaction dialogs.

Figure 4:
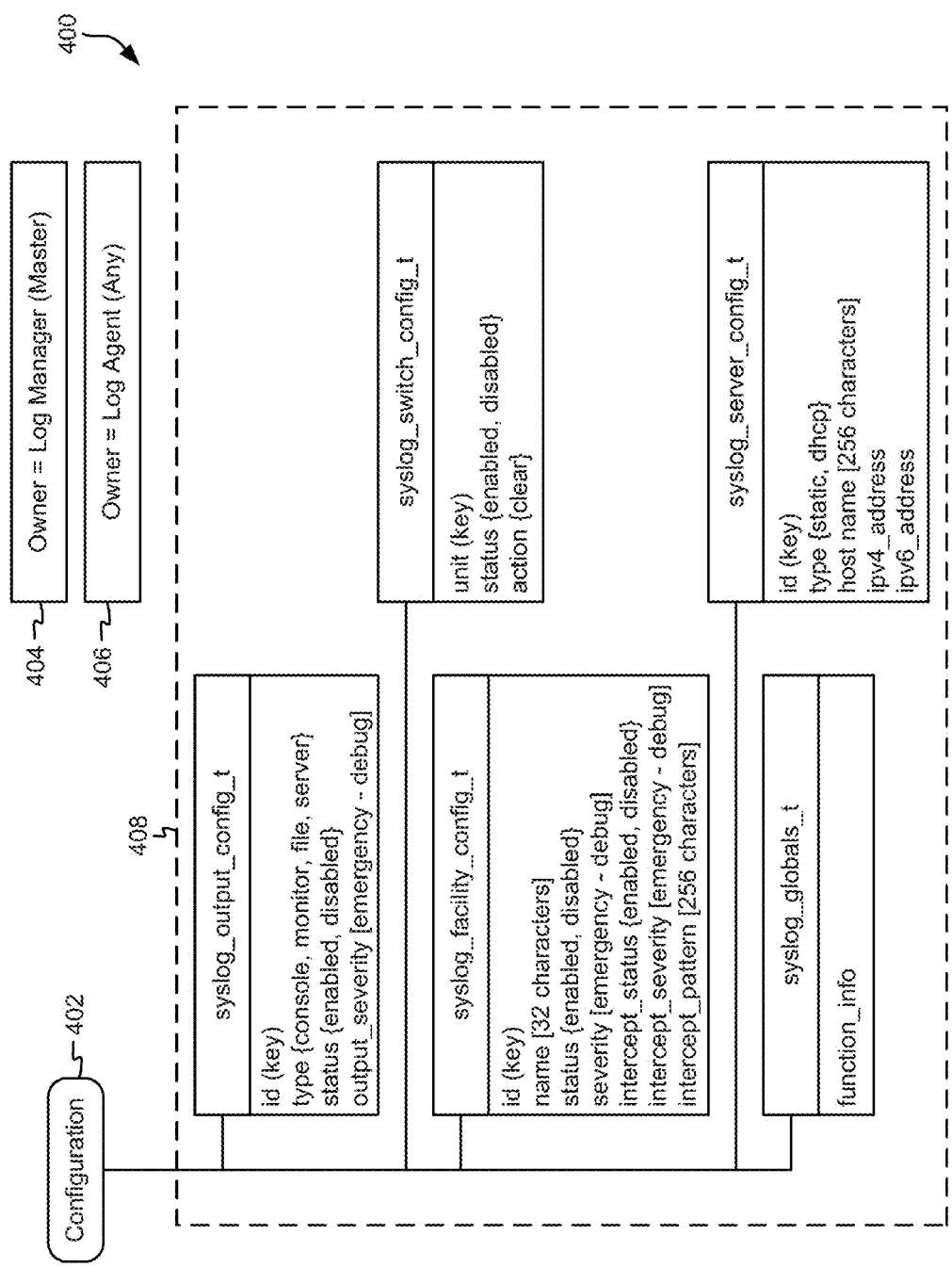
FIG. 4 is a simplified diagram showing syslog configuration data, according to one embodiment.

Now referring to FIG. 4, syslog configuration data 400 is shown according to one embodiment. Some key elements that will manage the logging infrastructure and relieve applications from any local burden, according to one embodiment, include a set of processes referred to as a log manager 404 and a log agent 406 that are configured to manage the logging configuration 402, and a logging shared library 408.

The log manager 404 is a process that is configured to receive the entire syslog configuration 402 from the management layer, stores this data, and distributes settings to all node controllers, in one approach.

The log agent 406 is a process that is configured to receive the configuration data from the log manager 404 and apply the settings to the actual syslog daemons (e.g., /etc/syslog-.conf). The settings (e.g., log destination, severity levels, facility settings, etc.) may be maintained in some shared memory owned by the log agent 406. This memory is only accessible by the logging library 408 code in one embodiment.

For example, when an application calls a library API, the library 408 code stores some information in global variables. Each library user receives a copy of the library 408 data. A client process logs events by calling an API, e.g., nlog_syslog( ). When this API is called, the library 408 code reads the log agent's shared memory to determine the settings that are applicable to a particular facility. Also, each client application process maps to a single syslog facility. Nevertheless, one facility may be associated to multiple processes in some approaches.

Facility names may only be associated to main application processes, in one embodiment. In other words, separate facility names are not defined for children threads and libraries. For children threads and libraries, component names are defined. Furthermore, the syslog service does not support sub-facilities in some embodiments. Configurable parameters are the data that corresponds to user configurable settings, which are saved on the startup configuration file.

Figure 5:
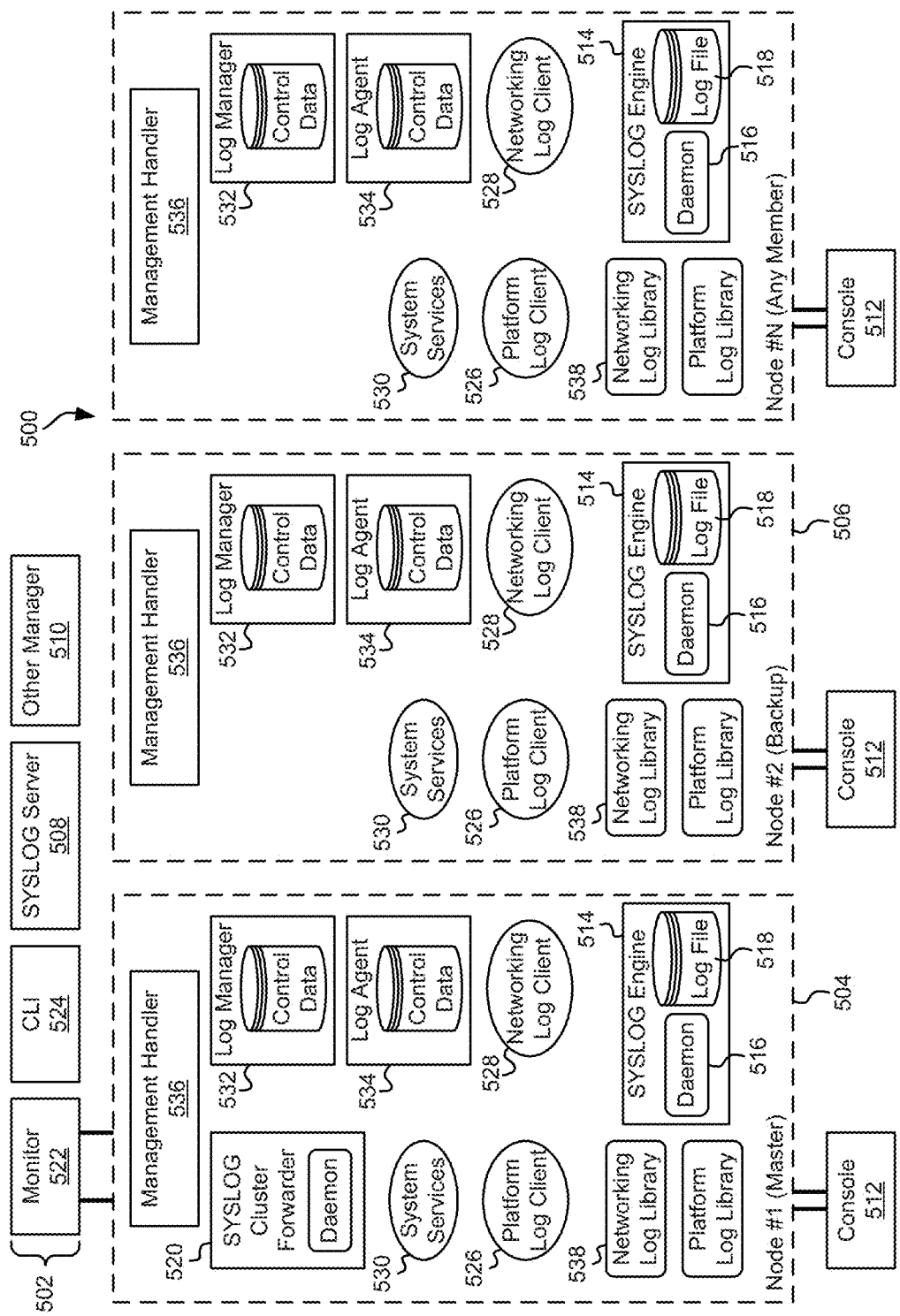
FIG. 5 is a simplified diagram showing a syslog architecture overview, according to one embodiment.

With reference to FIG. 5, an overall architecture of a chassis-based unified fabric networking device 500 is shown along with the logging control application.

The syslog output 502 includes the monitor/terminal 522 (telnet/SSH to the cluster management IP address), CLI 524, external syslog servers 508, and other specialized management systems 510 which may be accessed via the node controller log file 518 and the console 512.

The syslog engine 514 is a block or module that has a few sub-components, including daemons 516, such as the syslog daemon ("syslogd"), the file rotate daemons, etc., and one or more log files 518.

The syslog cluster forwarder 520 is configured to collect the events from all node controllers and spontaneously forward these events, at runtime, to external destinations, including the syslog servers 508 and the monitor/terminal 522. Since it is typically not possible to start two instances of the syslog daemon 516 in the same machine, the cluster forwarder 520 depicted in FIG. 5 is just a functional representation. This module is actually implemented by the same syslog daemon 516 running on the master controller 504.

The platform log client 526 includes a number of software components that are part of the platform software and use the syslog service provided by the syslog engine 514 to log events. The networking log client 528 includes a number of software components that are part of the management, control, and data plane components. The networking log client 528 uses the syslog service to log events. This includes platform dependent (data plane) and platform independent code (e.g., management and control planes). The behavior of the logs related to these events is configurable through the management interfaces and the corresponding settings may be saved in persistent networking software startup configuration files.

System services 530 include all software components and libraries used by the log manager 532 and the log agent 534 to operate, including applications that provide functionality such as service management, state check pointing, IPC communication, configuration management, etc.

The management handler 536 is an integrated management interface, which offers complete, unified management of the cluster and its individual network protocols. It allows a system administrator to configure and monitor all networking software applications through one centralized user connection. Furthermore, it includes a management shell, which enables SSH and/or TELNET access.

The log manager 532 is an application configured to manage aspects of all syslog functionality. This application receives management configuration (e.g., SET) and requests (e.g., GET, GET_NEXT, SHOW, etc.) from the management handler 536 on the master controller 504 and distributes the settings and data requests to the log agent 534 processes running on every node controller. All state information is synchronized with the log manager 532 process running on the backup node controller 506. Note that the log manager 532 process will run in every node controller regardless of its role (master, backup, or member). This is to allow "show" commands to be locally executed when the system is unstable and there is no IPC communication between a particular member node and the master node 504.

The log agent 534 is a control application that works with the log manager 532 to handle the syslog configuration settings and data requests. The log agent 534 runs on every node controller. In essence, the log agent 534 configures the syslog engine 514 and the syslog cluster forwarder 520 components, thereby ultimately driving updates to the corresponding "/etc/syslog.conf" files. Also, the log agent 534 maintains all syslog configuration settings available in the shared memory. This shared memory is accessed by client applications indirectly through the use of the APIs implemented by the networking syslog library. The library code eventually may access settings maintained in the log agent's 534 shared memory.

The networking log library 538 includes a shared library having a set of functions used by client applications for logging events. Some of the functionality provided by the library relies on accessing configuration settings stored in the log agent's 534 shared memory. Each client application links to this library. The APIs rely on a certain amount of global variables defined within the library code. These variables are instantiated in such a way that each client gets its own local copy of the variables.

Figure 6:
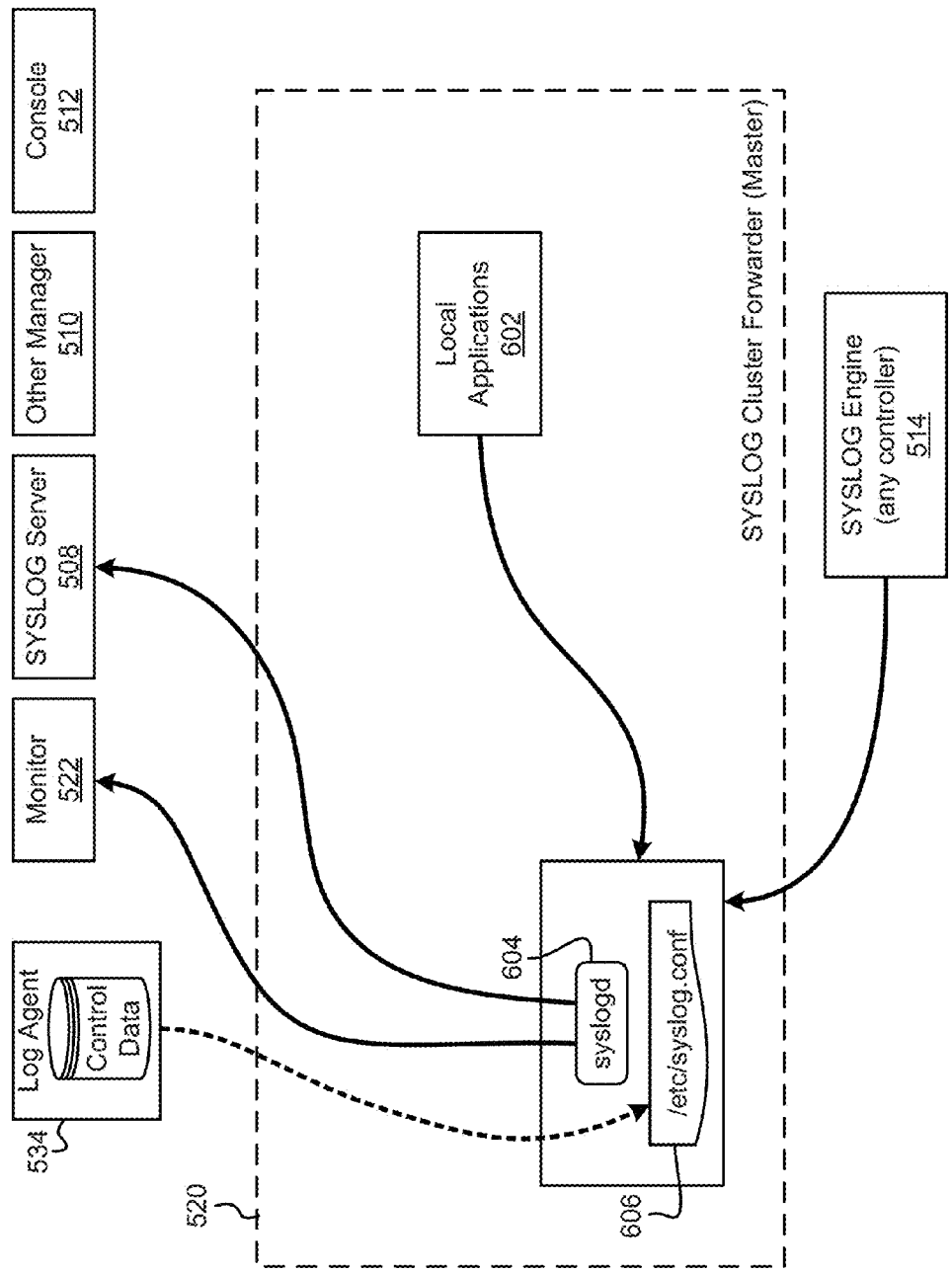
FIG. 6 is a simplified diagram showing a syslog cluster forwarder, according to one embodiment.

Now referring to FIG. 6, a syslog cluster forwarder 520 is shown in more detail, according to one embodiment. As shown, local applications 602 report activities to the syslog cluster forwarder 520, which stores them using the syslog daemon ("syslogd") 604 as local node controller logs with a Facility of LOCAL7, in one embodiment. The log agent 534 communicates with a syslog configuration file ("/etc/syslog.conf") 606 in the syslog cluster forwarder 520. These activities from the log agent 534 may be forwarded to all configured destinations, including the monitor/terminal 522, syslog server 508 destinations, other manager 510, console 512, etc. Also, the syslog engine 514 reports activities as remote node controller logs to the syslog cluster forwarder 520 with a Facility of SYSLOG, in one embodiment. These activities from the syslog engine 514 are only forwarded to the monitor/terminal 522 and syslog server 508 destinations.

The syslogd forwarder 520 is configured to not send any logs to "/dev/console" or store these logs in the local repository. Instead, the syslogd forwarder 520 is configured to only send local logs to the local console 512 and those have already been handled by the local syslogd on the master controller.

In order for the syslog daemon 604 to forward the events to the monitor sessions, the corresponding devices are added to the list of destinations within the "/etc/syslog.conf" 606. Also, since it is typically not possible to start two instances of the syslog daemon 604 in the same machine, the cluster forwarder 520 depicted in FIG. 6 is just a functional representation. This module is actually implemented by the same syslog daemon that is running on the master controller.

Figure 7:
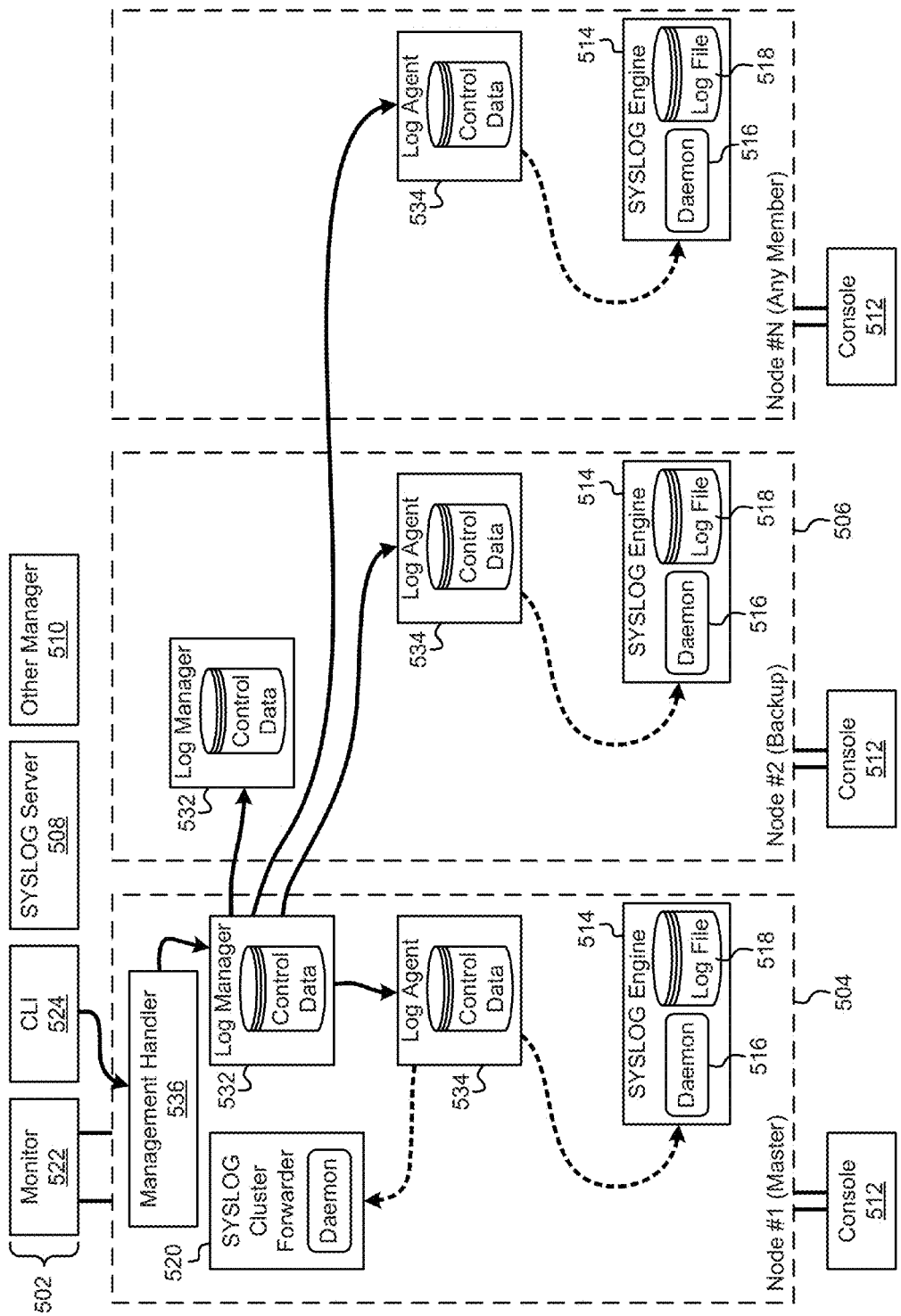
FIG. 7 is a simplified diagram showing configuration flow in a syslog architecture, according to one embodiment.

Now referring to FIG. 7, a flow configuration is shown according to one embodiment. The master node 504 receives information from the CLI 524 via the management handler 536 and forwards that information to the log manager 532 via IPCs. The log manager 532 is then able to disburse this information to the local log agent 534, and/or to any of the other instances of the log manager 532 and log agents 534 on the other node controllers. Each of the log agents 534 are responsible for configuring to the syslog cluster forwarder 520 (syslogd), and/or to the syslog engine 514 through direct function calls.

Figure 8:
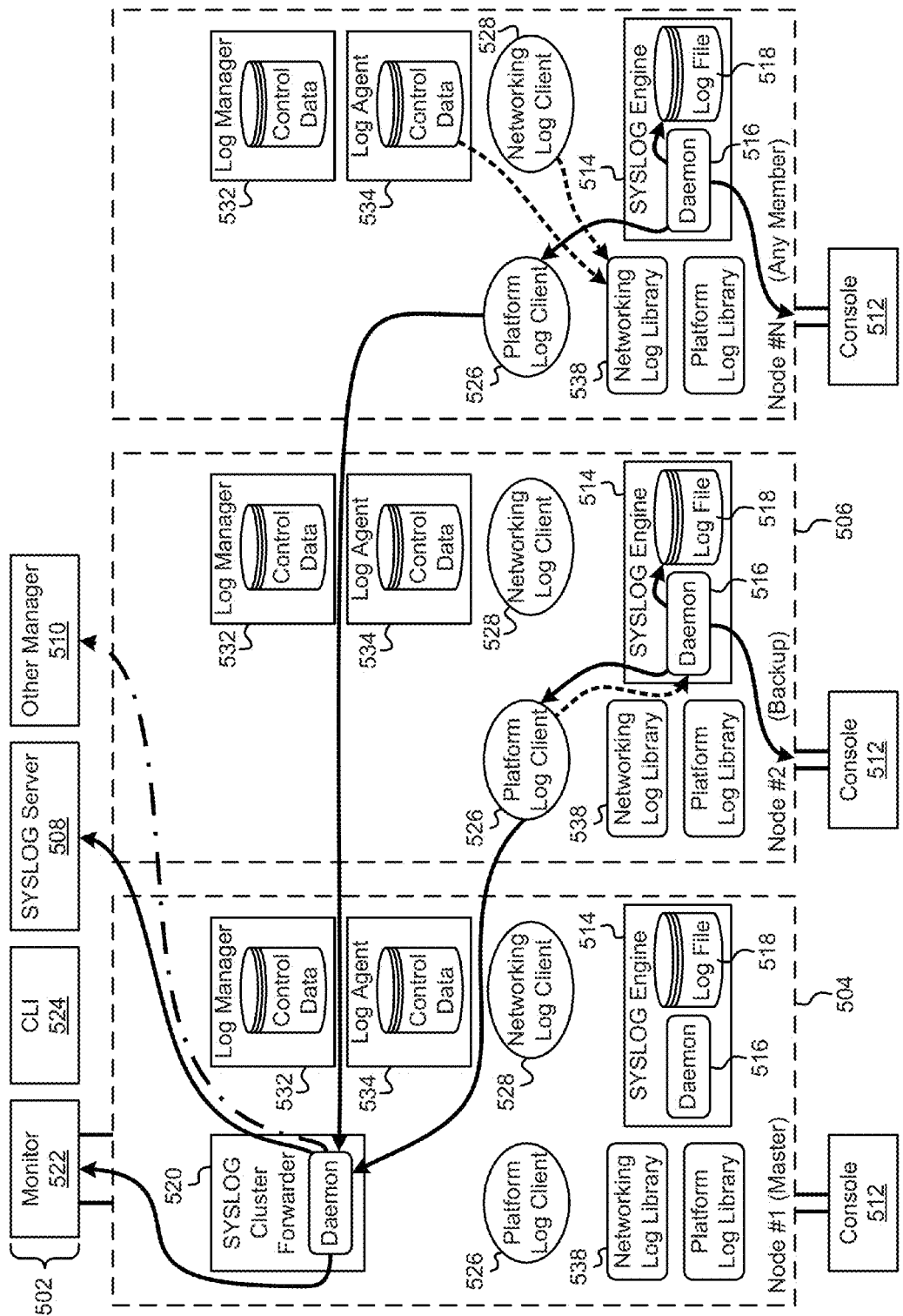
FIG. 8 is a simplified diagram showing event logging and spontaneous data output flow in a syslog architecture, according to one embodiment.

With reference to FIG. 8, event logging and spontaneous data output is shown according to one embodiment. As shown, syslog protocol packets are sent from the syslog daemon 516 to the syslog server 508 and the monitor 522, while any of the platform log clients 526 are configured to send syslog protocol packets to the syslog daemon 516 in the syslog cluster forwarder 520. The syslog daemon 516 in the syslog cluster forwarder 520 also is configured to send specific protocol messages to the other manager 510. Each of the platform log clients 526 are configured to send function calls to the syslog engine 514, while receiving syslog protocol packets therefrom. The daemon 516 of the syslog engine 514 is configured to store syslog protocols packets in the local log file 518 and send them to the local console 512.

Figure 9:
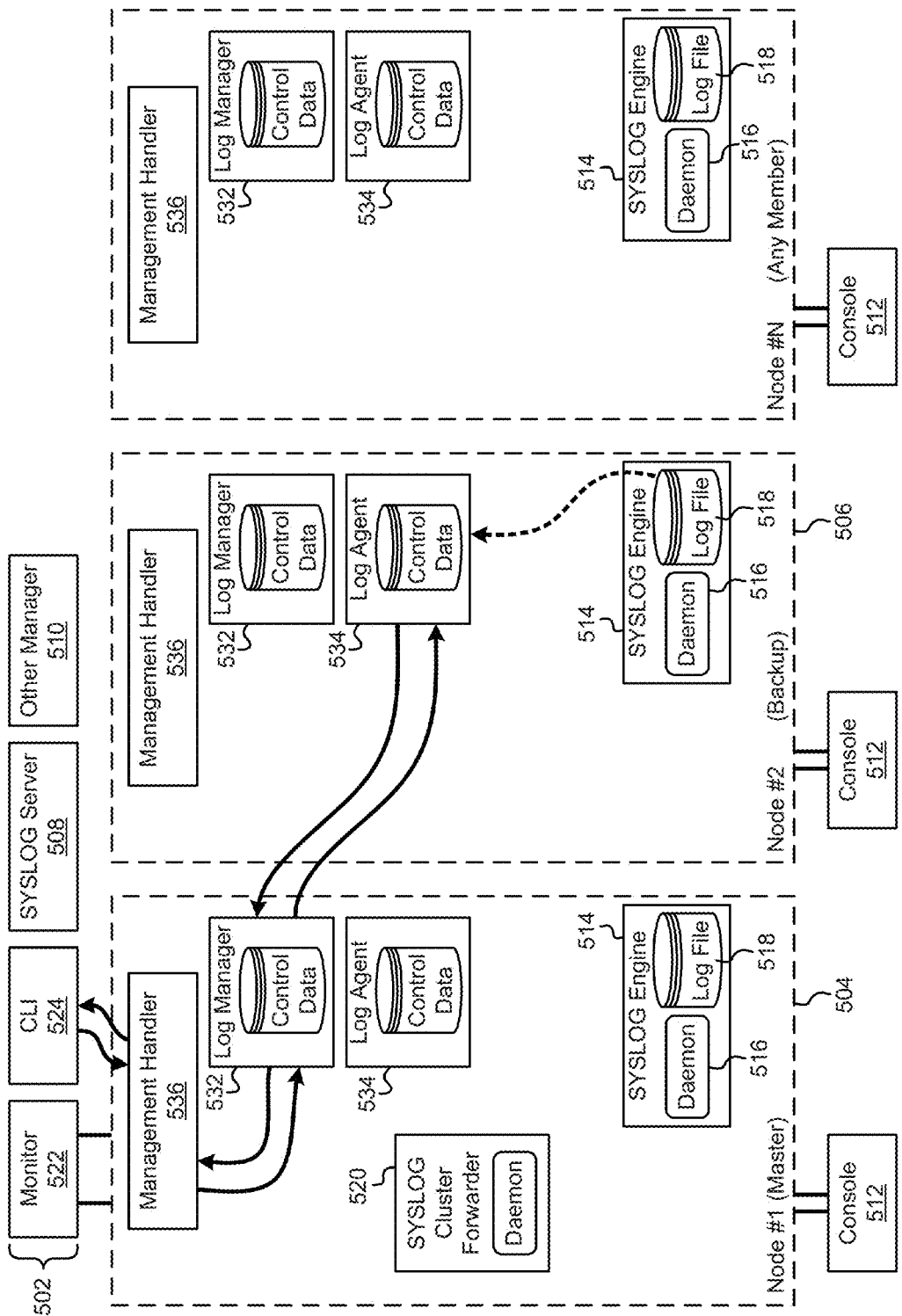
FIG. 9 is a simplified diagram showing data retrieval upon explicit request in a syslog architecture, according to one embodiment.

With reference to FIG. 9, syslog data retrieval upon explicit request is shown according to one embodiment. As shown, the CLI 524 requests data retrieval from the management handler 536 which communicates with the log manager 532 to acquire the data. The log manager 532 communicates with the log agent 534 on any of the other nodes to retrieve the data, with the log agent 534 gathering data from the log file 518 of the local syslog engine 514. After data is acquired, the management handler 536 communicates the data back through the CLI 524. The communications between the various components is via an IPC, while the log agent 534 reads data from the log file 518.

The control of SYSLOG functionality is achieved using two different techniques in one embodiment. First, the syslogd configuration file may be updated for each instance of syslogd running in the system. This includes not only the syslog daemon operating on each node controller, but also the centralized cluster forwarded instance. Note that these two types of syslog daemons are capable of having different settings. Second, system calls may directly control the operation of a particular syslog daemon instance.

The modifications to the syslogd configuration file (e.g., /etc/syslog.conf) may be performed by the log agent process on each node controller at the startup of the networking software. Most of the syntax present in the syslog configuration file may be based on the paradigm of facility.severity destination.

The following system calls, in one embodiment, may be used to control the runtime behavior of the syslog daemons: openlog: open connection to syslog, syslog: submit message to syslog, closelog: close connection to syslog, setlogmask: cause certain messages to be ignored based on their severities.

The logging system keeps track of the different devices that are seen as output or destination to the log events in one embodiment, according to Table 1, below.

TABLE 1

| Output | Set Up | Keeping Track |
|---|---|---|
| Log file | Pre-defined file names | Constant's definition |
| Console | Natively provided by the operating system | Fixed descriptor "/dev/console" |
| Terminal Monitor | Sessions are dynamically established as users connect to the system's IP addressed through Telnet or SSH | Part of the information is stored into the Log Manager/Agent's runtime database upon configuration changes (e.g. terminal monitor command is executed). Another part is retrieved from the management handler infrastructure, which keeps track of the vty and tty sessions. |
| Server | Manually configured by user or dynamically configured via DHCP | Information stored into Log Manager/Agent's runtime database upon configuration changes |

The contents of the syslog are maintained locally in the node controllers and they may only be retrieved by the master node, in one embodiment. In other embodiments, they may be retrieved by one of the other node controllers.

The sequence that may be used in one embodiment includes:

Upon reception of the message from the management handler component, including the arguments for the request, the master may set a global variable flag indicating that a long-term command is in progress. As long as this flag is set, the log manager process will not respond to other management commands. If additional commands are received while this long-term processing is in progress, the event will be en-queued.

Using the "system ( )" call, an scp (secure copy) operation may be performed to copy the most recent syslog file from the remote controller to the DRAM of the master node. Note that this is a synchronous call, but it is expected that the data will be retrieved fairly quickly. The speed of the control port on the management network may be fast (typically a few gigabits per second). Based on the size of the files, and the speed, this transfer may occur in a matter of a few seconds. Assuming that there are multiple files, the first file retrieved will always be the <filename>.log file.

Once the file has been copied, the master will start reading its content and sending it to the management handler client. Once all data has been sent, the temporary DRAM file on the master node will be deleted.

When the entire content of the file has been sent, an IPC message will be sent to the member node controller inquiring about the existence of older files. A response providing the file names will be received. When an older file is not being copied, the secure copy step will be repeated, but now the newest old file (e.g., <filename>.0.log) will be copied. This process will be repeated until there are no files left.

At this point, the long-term flag is cleared. Then, the log manager will check the queue of pending requests to determine if there are any pending commands to be processed.

The syslog functionality will be made visible to client applications, in one embodiment, through a Linux shared library based on the following principles:

There is a single copy of the source code, which is used by all client applications.

Each client process will have its own "private" copy of the global data.

Figure 10:
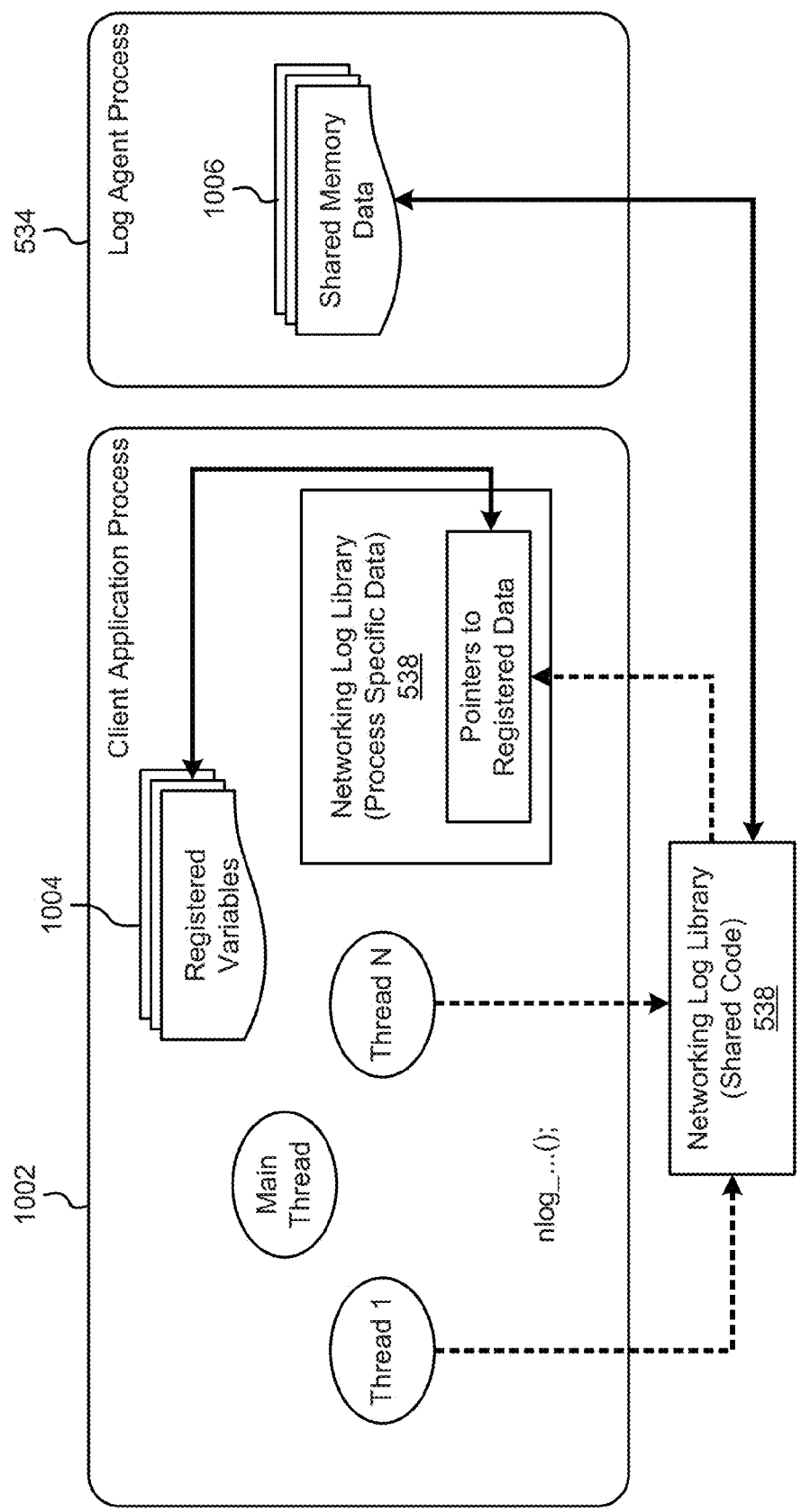
FIG. 10 is a simplified diagram showing a syslog library architecture, according to one embodiment.

FIG. 10 provides some illustration about how event logging may operate in one embodiment. The event logging operation may be summarized as follows:

Applications 1002 interface with the syslog service through direct function calls to a set of APIs, which are implemented by the networking log library 538, in one embodiment.

The main goal of these APIs is ultimately to send events to the underlying syslog infrastructure, in one embodiment, i.e., syslog daemon.

In order to perform their logging operation, these tasks rely on some global data that keeps track of state information, in one embodiment. Part of that information is provided by the client application 1002 process itself. The client application 1002 process registers a list of parameters or variables 1004 with the networking log library 538 thereby making such data visible to the library's data. Note that the library's data and client application 1002 process data are stored within the same memory area, i.e., the process' memory.

Other settings required by the library to correctly process events are obtained from the shared memory 1006 of the log agent 534, in one embodiment. This includes information such as the severity level configuration per facility.

In one embodiment, prolix events may be logged only at a certain interval. The goal of this scheme is to limit the periodicity at which a particular event that occurs very frequently is logged, to save on resources. In one embodiment, a macro may be defined with an additional argument called "interval," which is expressed in seconds and defines how long a wait occurs before logging the next occurrence of a message produced in the same file and line.

In another embodiment, an event may be logged only once in the lifetime of a process. This functionality may also be provided via a macro in one approach.

Infrastructure rate limiting may also be controlled. From a high-level, three control resources may be used. The first is a rate timer, which is a timer that is run within the context of the client process implemented within the library code. The second is an event counter which may be used to keep a count of logged events per client process through a global variable (each client process gets a copy of such control variables). A third is an event status which may be used to keep an internal log enabled library variable, also global with one instance per client. In the beginning prior to tracking, the event counter would be zero and the event status would be enabled. Upon the rate timer expiration, the counter of events is checked. If the number is greater than the limit, then that client will be internally blocked from logging by setting the event status to disabled. The idea is that the timer runs for a length of time (e.g., 5 seconds in duration) in which these events may be cleared and it does not affect the actual logging processing.

In one approach, a log intercept feature may be used as a process configured to register a callback function to be invoked by the syslog library (code running in the context of the calling process, logging an event) in case an event of a certain severity or higher severity is logged by that process, and/or an event, whose string matches a pattern or a list of patterns, is logged by that process.

The syslog library then maintains three pieces of information per facility: the intercept severity, a comparison string, and the callback function address. The callback function may have the following signature: void func (int severity, char *pstr), in one embodiment.

Networking applications may coexist with platform software logs. Depending on the specific design, the platform software component may store the networking log messages of a certain priority in its "proprietary" repository so that it may generate events to specific management entities. Therefore, it is possible that all syslog messages from the networking log clients over a specified priority (e.g., LOG_NOTICE) may be stored in the platform software repository following a proprietary format.

At the same time, one of the key advantages of the proposed solution is that the networking software layer is aware of the events originated from the platform software log clients. As a result, there is a possibility of log events looping back between the platform and the networking software components.

To prevent such looping, the networking log controller software, which is listening for the platform software client events, may use a different facility when going to syslog so that the platform software may determine when to throw those looped log events away. A proposed scheme in one embodiment is summarized in Table 2, below.

TABLE 2

| Event Source | Facility | Description |
| --- | --- | --- |
| Networking Log Client | local 7 | Events generated by client applications. These events must be processed by both the networking and platform software. |

TABLE 2-continued

| Event Source | Facility | Description |
|---|---|---|
| Platform Software Log Client (native) | Anything different than local 6 and local 7 | Events generated by the platform log clients. |
| Platform Software Log Client (replayed by the networking log controller) | local 6 | Events retrieved by the networking log controller from the platform software either at networking software start-up or after. These events will be "replayed" by the networking log controller. However, they must be dropped by the platform software. |

One challenge to be overcome with this scheme relates to the way the standard syslog functionality operates. The networking log controller (i.e., log manager and log agent) specify a single facility when calling openlog( ). In short, only one facility per process is allowed because the "openlog( )" API is not thread specific. That being said, a separate process is used to replay the platform software events and allow them to become visible to the networking software context.

Figure 11:
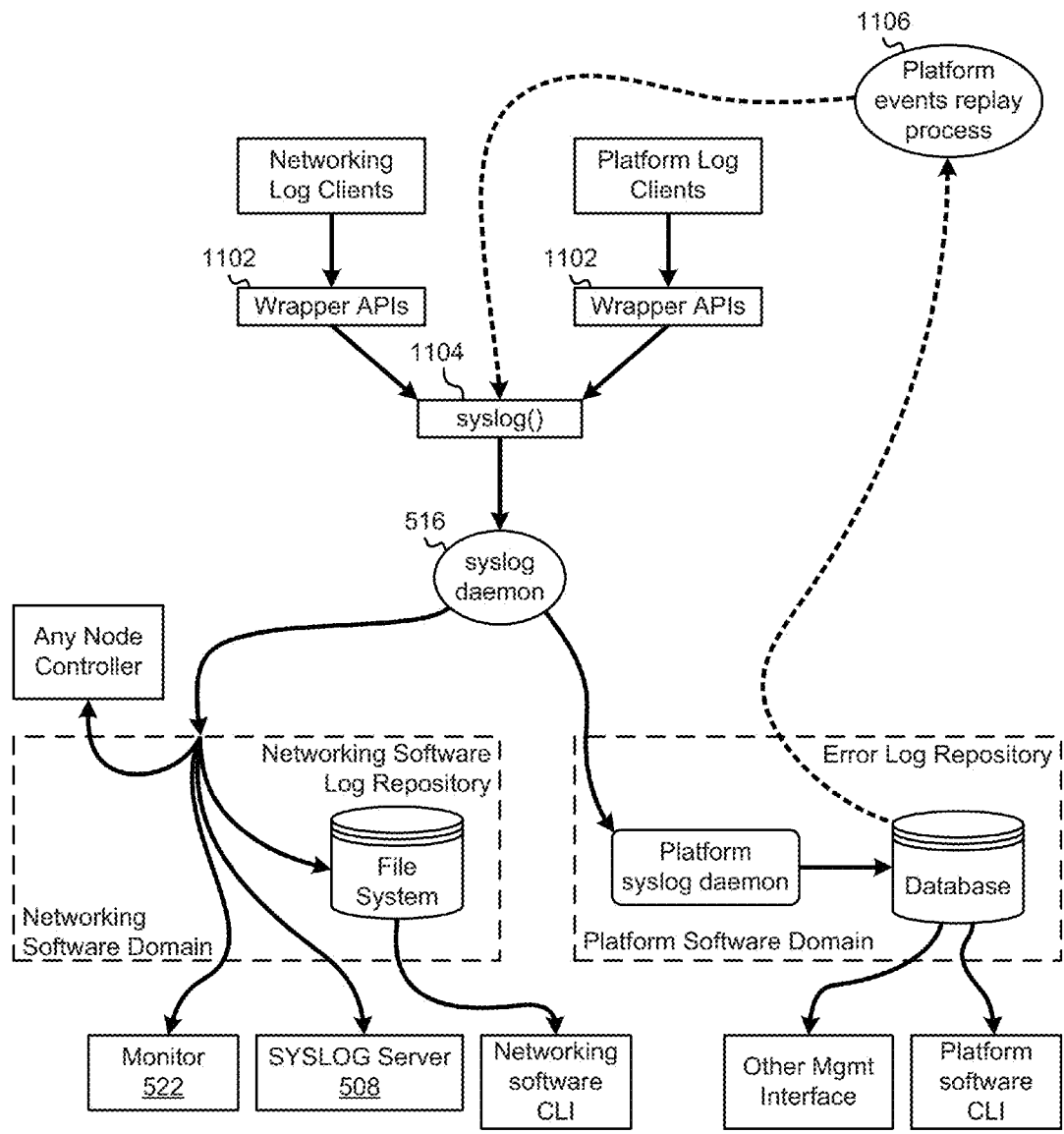
FIG. 11 is a simplified diagram showing syslog configuration data, according to one embodiment.

FIG. 11 illustrates networking and platform software logging co-existence according to one embodiment. The platform events replay process 1106 is implemented as a lightweight process in one approach. In other words, it is extremely simple. No check-point, no heartbeat on its own, etc. Some synchronization is required with the log agent(s). Only the platform software events are processed once the networking software has been fully initialized. These initial platform software events are replayed before the events related to networking software clients are replayed (as is explained in more detail later). Furthermore, the networking software events are replayed, but this is done by the log agent using the facility "local 7" in one approach.

The networking software may add some extra formation related to the format and even send the events to the syslog daemon 516. For example, all platform software events may be assigned an entity type "platform," in contrast to the networking software events, which are assigned entity types "control-plane" or "data-plane."

Also, the networking software (e.g., log manager and agent) may use a set of APIs 1102 to be exposed by the platform software at start-up to retrieve all the initial events, which occurred before the networking software started. This includes the case of log manager process restarts as well. The networking software keeps a persisted value of the last log event identifier it has seen from the platform software. When the networking layer software starts up, it may ask the platform software (using some specific API) for the current log identifier and then read all of the log entries between its persisted log identifier and the returned log identifier.

Once the networking software has retrieved the start-up events, it may register for asynchronous events that may be generated on each log creation within the platform software database, so it would be able to retrieve all of the events while it is running in a timely fashion.

Once the networking software retrieves the events from the platform software, either at start-up or runtime, the event may be submitted through the syslog API 1104. This will cause the events to show up on the console, monitor/terminals 522, and external syslog servers 508, when the networking software configuration settings require.

In order to handle events before the networking software's logging control is configured, the syslog service will be managed by a pair of processes called log manager (running on master and backup) and log agent (running on all node controllers). The log manager processes the networking software start-up configuration events received through the management handler components, whereas the log agent applies these settings to the operating system syslog daemon control file (/etc/syslog.conf).

Client applications use the syslog service through a set of APIs 1102 whose behavior greatly depends on the contents of a shared memory owned by the log agent process. This shared memory stores parameters provided by each client application as well as the configurable settings maintained in the networking software start-up configuration.

Whenever events are logged, the log APIs end up making system calls to the standard syslog( ) API 1104. Therefore, the events are relayed to the syslog daemon 516 right away. The syslog daemon 516, based on the configuration, decides what to do with the events in terms of destination. Events may be sent to an external syslog server 508, the console, stored in the log files, and/or sent to monitors/terminals 522 (Telnet/SSH vtys).

To set a context for this description, assume that the management handler components are such that the networking software start-up configuration is only parsed and sent to the networking software applications after all applications have been started. Obviously, this behavior is implementation dependent and it may occur, for example, because the management handler component is the last one to be started, but it is also the module that reads the start-up configuration from flash and sends the information to the client applications.

Basically, the syslog service is fully functional only after two conditions are met: 1) the shared memory owned by the log agent is set up; and 2) the networking software start-up configuration is parsed and given to the log manager. This process distributes the information to the log agents running on all node controllers, which apply the relevant settings both to the shared memory as well as to the syslog daemon.

In order to process log API calls that are made before the service is fully operational, without requiring drastic architecture changes, the following solution is presented.

In a first embodiment, shared memory is set up in a specific way. Within each log library API that includes logging functions (e.g., nlog_syslog) as well as initialization functions (e.g., nlog_open, nlog_config_process), it will be determined whether the shared memory has been allocated. When the shared memory has not yet been allocated, the library code will allocate the shared memory and initialize it with default settings. When the log agent process starts, it will also check whether the shared memory is allocated and take similar actions. Therefore, the net effect is that the shared memory will be allocated as soon as possible, whenever it is needed.

The following pseudo-code illustrates how the shared memory checks may be performed. This code handles race conditions whereby, e.g., two components come up about the same time and both discover that shared memory is not allocated. In this case it is ensured that both components will not try to allocate the shared memory.

```
if ((fd = shm_open(shm_name, (O_CREAT | O_EXCL | O_RDWR),
        (S_IREAD | S_IWRITE))) >= 0 ) {
    // If we get here, the shared memory does not yet exist.
    // We are the "first" client process instance.
    first = 1;
} else if (errno == EEXIST){
    // Otherwise, the shared memory already exists.
```

-continued

```
// Try to open the shared memory instance normally and share it
// with existing clients
if ((fd = shm_open(shm_name, O_RDWR, (S_IREAD |
    S_IWRITE))) < 0) {
    err = NLOG_ERR_OPEN_SHM;
    nlog_exception("%s (%s:%d)", s_print_nlog_err_t(err),
            strerror(errno), errno);
        return (err);
    }
} else {
    err = NLOG_ERR_CREATE_SHM;
    nlog_exception("%s (%s:%d)", s_print_nlog_err_t(err),
    strerror(errno), errno);
    return (err);
}
```

In a second embodiment, the log agent process maintains a global flag readable through API nlog_syslog_ready( ), whose default value is false, to report service status. This flag may be stored in the log agent's shared memory. This flag will be set to true, in one embodiment, only when the two following conditions are met: 1) the shared memory owned by the log agent is set up; and 2) the networking software start-up configuration is parsed and given to the log manager. This process distributes the information to the log agents running on all IOMC controllers, which apply the relevant settings both to the shared memory as well as to the syslog daemon.

According to a third embodiment, whenever a syslog API is invoked by any client application, nlog_syslog_ready( ) is called. When the flag is set to true, the event is processed as usual. In other words, the checks are performed based on the passed arguments and shared memory settings and the events are sent to the syslog daemon through the standard syslog( ) API.

On the other hand, when nlog_syslog_ready( ) returns false, then a special processing is performed in one embodiment. The complete code implemented by the API is executed, with a twist at the end. By default, the standard syslog( ) API, which would send the event to the syslog daemon, will not be called. Instead, the implementation provides a debug flag that, when enabled, forces all events to be sent to the standard syslog processing path regardless of when they occur.

In other words, syslog events are handled as usual as far as the library code and client applications are concerned. For example, the facility information is stored, list of mnemonics, list of message descriptions, etc. Also, information about the service state (i.e., enabled/disabled) is stored. However, logged events are not dispatched to the syslog daemon. Instead, these events are en-queued for later processing (e.g., as soon as the service is actually ready).

In order to en-queue the events, the library API will simply write the final strings to the log agent's shared memory using the API nlog_enqueue_syslog( ). This API will store the events in a circular buffer maintained in the shared memory called "pending log buffer" in one embodiment. Note that the actual syslog message strings are also stored. Note that each buffer reflects the logs related to a single log agent instance (i.e., node controller). First of all, the events are en-queued regardless of their severity. In other words, even debug level events will be saved in the pending queue. The idea is that when the service_ready state is reached, the configuration settings (e.g., which severity is set for each client) are known and may be used to filter which events will actually be replayed to the syslog daemon. However, when that state is not reached, the actual severity settings are not known. In this case, in order to avoid precious data loss, all events in the pending buffers are replayed, thereby ensuring no loss of data.

According to a fourth embodiment, as soon as each log agent process retrieves its complete start-up configuration, it will proceed as follows: 1) read all events stored in the shared memory's pending log buffer and send them to the syslog daemon by calling the standard syslog( ) (since only strings were stored, the processing will be extremely simple); 2) call nlog_set_syslog_ready(true); and 3) clean up the pending log buffer.

However, when the node controller suffers a power failure before the service_ready state is reached, all the events reported by applications are lost. In other words, the syslog events that occur within this time window are not persistent. Also, the size of the shared memory used for the purposes of storing the pending log events is fixed and known at start-up time. Because a circular buffer may be used (in preferred embodiments), events may get lost when too many events push the oldest events out of the circular buffer. In case a buffer overflow is detected, a warning message is logged at the end of the processing indicating this buffer overflow and specifying the number of entries that were lost.

Figure 12:
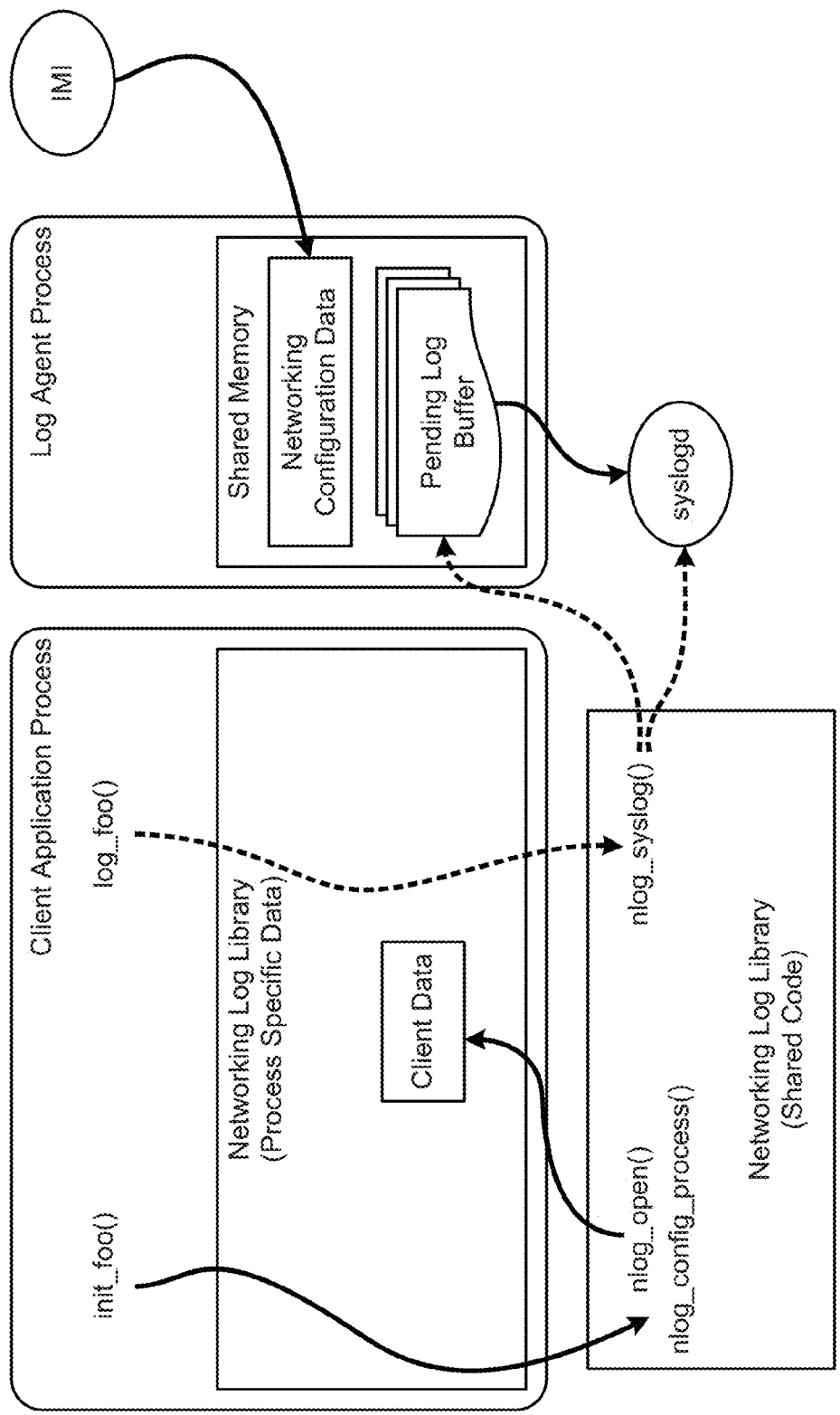
FIG. 12 is a simplified diagram showing co-existence of networking and platform software logging, according to one embodiment.

This concept is illustrated in FIG. 12 according to one embodiment. As shown, nlog_syslog( ) uses data stored in the client data to perform some filtering according to one embodiment, as well as to gather information about the client application, such as facility name, list of mnemonics, and message descriptions. In addition, nlog_syslog( ) also uses data stored in "Networking Software Configuration Data" to make decisions, including filtering events, in one approach. Also, some of the information stored in "Networking Software Configuration Data" may be used to configure the way that the syslog daemon operates, including some filtering as well, in some approaches.

In a fifth embodiment, one aspect of the design is taken into account, particularly what to do with the "Pending Log Buffer" in case the log agent process crashes at start-up, or any other networking software process crashes, so that the service_ready state is never reached. In these cases, the pending events are hanging with no action being taken on them.

In order to sort this out, when a fatal exception occurs before reaching the system_ready state, where the entire networking software will be restarted, the entire content of the "pending buffer" may be added to the core dump file related to the node controller, in one approach.

In another approach, when the log agent process is restarted, the entire content of the "pending buffer" may be added to the core dump file related to the node controller. Furthermore, information about the current contents of the "pending buffers" is maintained, so that when the log agent process is restarted, the existing data (prior to exception) is not overwritten.

In a sixth embodiment, an implementation may provide a debug flag that, when enabled, forces all events to be sent to the standard syslog processing path regardless of when they occur. This is important to provide the ability to force all events to be syslogged as they came in, in case an issue is debugged that occurs before the log agent has come up and which prevents the log agent from coming up (e.g., a failure in a system application that provides services to the log manager or log agent processes, when such services allow complete initialization of the logging infrastructure). This technique provides visibility to the logs that would normally have only been silently queued waiting for the log agent to be ready.

Figure 13:
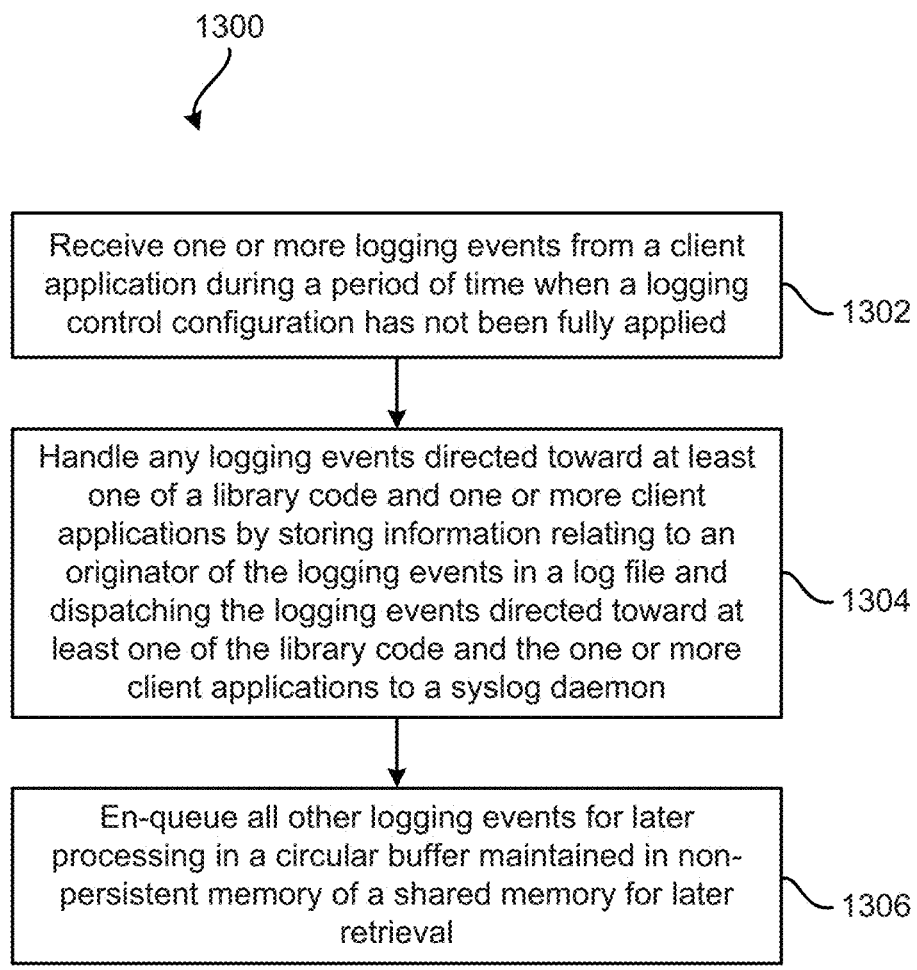
FIG. 13 is a flowchart of a method to en-queue syslog events when the system is not ready to process the events, according to one embodiment.

Now referring to FIG. 13, a flowchart of a method 1300 is shown, according to one embodiment. The method 1300 may be performed in accordance with the present invention in any of the environments depicted in FIGS. 1-12, among others, in various embodiments. Of course, more or less operations than those specifically described in FIG. 13 may be included in method 1300, as would be understood by one of skill in the art upon reading the present descriptions.

Each of the steps of the method 1300 may be performed by any suitable component of the operating environment. For example, in one embodiment, the method 1300 may be partially or entirely performed by a controller, a processor, a switch, a switch controller, etc.

As shown in FIG. 13, method 1300 may initiate with operation 1302, where one or more logging events are received from a client application during a period of time when a logging control configuration has not been fully applied. The logging events may be received by a log agent, a log manager, a cluster forwarder, a master node controller, a back-up node controller, a member node controller, etc.

In operation 1304, any logging events directed toward at least one of a library code and one or more client applications are handled by storing information relating to an originator of the logging events in a log file and dispatching the logging events directed toward at least one of the library code and the one or more client applications to a syslog daemon. The syslog daemon is then configured to process the logging events and perform some action, such as discarding them, logging them into a persistent log, and/or performing some other action based on the logging event.

In operation 1306, all other logging events are en-queued for later processing in a shared memory. In one embodiment, the logging events may be en-queued in a circular buffer of the shared memory.

In one embodiment, en-queuing the logging events for later processing may include writing a final string and syslog message string of each logging event to the shared memory in a portion of the shared memory allocated to a log agent instance for which the logging events pertain, thereby providing some segregation between log agents which are utilizing the shared memory, and making retrieval of logging events for a particular log agent more efficient.

Furthermore, in one approach, method 1300 may include creating and/or allocating the shared memory using at least one of the logging control application and the one or more client applications prior to storing logging events thereto.

In one embodiment, the shared memory may be accessible to the logging control application and the one or more client applications. Also, in any embodiment, the shared memory may be owned by the logging control application. In even more embodiments, a client application may trigger creation and/or allocation of the shared memory after determining that the shared memory has not already been created and/or allocated.

According to one embodiment, other logging events may be stored to a circular buffer maintained in non-persistent memory of the shared memory for later retrieval.

In further embodiments, method 1300 may include detecting that buffer overflow has occurred causing some of the other logging events to be discarded and logging a warning message after processing the other logging events from the circular buffer, the warning message specifying a number of logging events which have been discarded.

In additional embodiments, method 1300 may include retrieving the other logging events from the circular buffer for processing after the logging control configuration has been fully applied, as indicated by a logging service ready state being enabled, filtering the other logging events based on a severity of individual logging events to provide filtered logging events after the logging control configuration has been fully applied, and replaying the filtered logging events by sending the filtered logging events to the syslog daemon for handling thereof after the logging control configuration has been fully applied. In this way, nuisance and other low-level logging events may be skipped due to the filtering, while important logging events may be replayed, thereby enhancing the efficiency of this process over replaying all logging events.

In some more embodiments, method 1300 may include retrieving the other logging events from the circular buffer when the logging control configuration has not been fully applied, as indicated by a logging service ready state not being enabled, and replaying the other logging events by sending the other logging events to the syslog daemon for handling thereof, regardless of a severity indicated for any individual logging events, prior to the logging control configuration being fully applied.

According to more approaches, the other logging events may be en-queued for later processing regardless of a severity indicated for any individual logging events. This ensures that all important logging events are stored for later processing and precious data is not lost.

In another embodiment, method 1300 may include determining whether a global flag indicating a service status of a log agent for at least one of the client applications is set to true. The global flag is readable via an API, and is set to true only when: the shared memory is created and/or allocated for the log agent and a networking software start-up configuration is parsed and provided to a log manager.

In further embodiments, method 1300 may include processing logging events provided by any client application for which the global flag of a corresponding log agent is set to true by sending the logging events to the syslog daemon, and adding all logging events in the circular buffer to a core dump file related to a node controller which issued the logging events when a fatal exception occurs before the global flag is set to true.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

Presented herein in various embodiments is a solution that may be used in many distinct architectures (standalone, stackable, chassis-based, and/or unified fabric), thereby reducing effort and development time. It increases the time span of stored logging information by maximizing the use of the available persistent storage space (i.e., Flash). In general the approaches presented herein will enhance the ability to troubleshoot products and networks, especially large scale chassis-based or unified fabric products. Also, it allows events that are logged to be processed by software applications even before the start-up configuration settings related to the logging services have been applied to the logging control software. In addition, it provides a mechanism for the networking device software to be aware of the events logged by the underlying platform software using a common repository and format.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system, comprising:
a master node controller comprising a processor and logic integrated with and/or executable by the processor, the logic being configured to:
receive one or more logging events from a client application during a period of time when a logging control configuration of a logging control application has not been fully applied;
handle any logging events directed toward at least one of a library code and one or more client applications by storing information relating to an originator of the logging events in a log file and dispatching the logging events directed toward at least one of the library code and the one or more client applications to a syslog daemon;
en-queue all other logging events independent of a severity rating for any individual logging events for later processing in a shared memory, wherein the shared memory is owned by the logging control application; and
processing the en-queued logging events in response to determining that the logging control configuration has been fully applied.

2. The system as recited in claim 1, wherein the other logging events are stored to a circular buffer maintained in non-persistent memory of the shared memory for later retrieval.

3. The system as recited in claim 2, wherein the logic is configured to:
detect that buffer overflow has occurred causing some of the other logging events to be discarded; and
log a warning message after processing the other logging events from the circular buffer, the warning message specifying a number of logging events which have been discarded.

4. The system as recited in claim 2, wherein the logic is configured to:
retrieve the other logging events from the circular buffer for processing after the logging control configuration has been fully applied, as indicated by a logging service ready state being enabled;
filter the other logging events based on a severity of individual logging events to provide filtered logging events after the logging control configuration has been fully applied; and
replay the filtered logging events by sending the filtered logging events to the syslog daemon for handling thereof after the logging control configuration has been fully applied.

5. The system as recited in claim 2, wherein the logic is configured to:
retrieve the other logging events from the circular buffer when the logging control configuration has not been fully applied, as indicated by a logging service ready state not being enabled; and
replay the other logging events by sending the other logging events to the syslog daemon for handling thereof, regardless of a severity indicated for any individual logging events, prior to the logging control configuration being fully applied.

6. The system as recited in claim 2, wherein the logic is further configured to create and/or allocate the shared memory using at least one of the logging control application and the one or more client applications prior to storing logging events thereto, wherein the shared memory is accessible to the logging control application and the one or more client applications, and wherein the shared memory is owned by the logging control application.

7. The system as recited in claim 6, wherein a client application triggers creation and/or allocation of the shared memory after determining that the shared memory has not already been created and/or allocated.

8. The system as recited in claim 1, wherein the logic is configured to determine whether a global flag indicating a service status of a log agent for at least one of the client applications is set to true,
wherein the global flag is readable via an application programming interface (API), and
wherein the global flag is set to true only when:
the shared memory is created and/or allocated for the log agent; and
a networking software start-up configuration is parsed and provided to a log manager.

9. The system as recited in claim 8, wherein the logic is further configured to process logging events provided by any client application for which the global flag of a corresponding log agent is set to true by sending the logging events to the syslog daemon.

10. The system as recited in claim 8, wherein the logic is further configured to add all logging events in the circular buffer to a core dump file related to a node controller which issued the logging events when a fatal exception occurs before the global flag is set to true.

11. The system as recited in claim 1, wherein the logic configured to en-queue all other logging events for later processing comprises:
logic configured to write a final string and syslog message string of each logging event to the shared memory in a portion of the shared memory allocated to a log agent instance for which the logging events pertain.

12. A method, comprising:
receiving one or more logging events from a client application during a period of time when a logging control configuration of a logging control application has not been fully applied;
handling any logging events directed toward at least one of a library code and one or more client applications by storing information relating to an originator of the logging events in a log file and dispatching the logging events directed toward at least one of the library code and the one or more client applications to a syslog daemon; and
during the period of time when the logging control configuration of the logging control application has not been fully applied, en-queuing all other logging events for later processing in a circular buffer maintained in non-persistent memory of a shared memory for later retrieval, wherein the other logging events are en-queued for later processing regardless of a severity indicated for any individual logging events.

13. The method as recited in claim 12, further comprising:

detecting that buffer overflow has occurred causing some of the other logging events to be discarded;

logging a warning message after processing the other logging events from the circular buffer, the warning message specifying a number of logging events which have been discarded;

retrieving the other logging events from the circular buffer for processing after the logging control configuration has been fully applied, as indicated by a logging service ready state being enabled;

filtering the other logging events based on a severity of individual logging events to provide filtered logging events after the logging control configuration has been fully applied; and replaying the filtered logging events by sending the filtered logging events to the syslog daemon for handling thereof after the logging control configuration has been fully applied.

14. The method as recited in claim 12, further comprising:

creating and/or allocating the shared memory using at least one of the logging control application and the one or more client applications prior to storing logging events thereto, wherein the shared memory is accessible to the logging control application and the one or more client applications, and wherein the shared memory is owned by the logging control application, wherein a client application triggers creation and/or allocation of the shared memory after determining that the shared memory has not already been created and/or allocated;

retrieving the other logging events from the circular buffer when the logging control configuration has not been fully applied, as indicated by a logging service ready state not being enabled; and replaying the other logging events by sending the other logging events to the syslog daemon for handling thereof, regardless of a severity indicated for any individual logging events, prior to the logging control configuration being fully applied.

15. The method as recited in claim 12, further comprising determining whether a global flag indicating a service status of a log agent for at least one of the client applications is set to true, wherein the global flag is readable via an application programming interface (API), and wherein the global flag is set to true only when:
the shared memory is created and/or allocated for the log agent; and
a networking software start-up configuration is parsed and provided to a log manager.

16. The method as recited in claim 15, further comprising:

processing logging events provided by any client application for which the global flag of a corresponding log agent is set to true by sending the logging events to the syslog daemon; and adding all logging events in the circular buffer to a core dump file related to a node controller which issued the logging events when a fatal exception occurs before the global flag is set to true.

17. The method as recited in claim 12, wherein the en-queuing all other logging events for later processing comprises writing a final string and syslog message string of each logging event to the shared memory in a portion of the shared memory allocated to a log agent instance for which the logging events pertain.

18. A computer program product, the computer program product comprising a computer readable storage medium having program instructions embodied therewith, the program instructions being executable by a master node controller to cause the master node controller to:

receive one or more logging events from a client application during a period of time when a logging control configuration of a logging control application has not been fully applied;

handle any logging events directed toward at least one of a library code and one or more client applications by storing information relating to an originator of the logging events in a log file and dispatching the logging events directed toward at least one of the library code and the one or more client applications to a syslog daemon;

create and/or allocate a circular buffer maintained in non-persistent memory of a shared memory using at least one of the logging control application and the one or more client applications, wherein the shared memory is accessible to the logging control application and the one or more client applications, and wherein the shared memory is owned by the logging control application; and en-queue all other logging events for later processing in the circular buffer of the shared memory for later retrieval regardless of a severity indicated for any individual logging events.

19. The computer program product as recited in claim 18, wherein the program instructions are further executable by the master node controller to:

detect that buffer overflow has occurred causing some of the other logging events to be discarded;

add all logging events in the circular buffer to a core dump file related to a node controller which issued the logging events when a fatal exception occurs before a global flag is set to true, wherein the global flag is set to true only when:
the shared memory is created and/or allocated for a log agent; and
a networking software start-up configuration is parsed and provided to a log manager;

log a warning message after processing the other logging events from the circular buffer, the warning message specifying a number of logging events which have been discarded;

retrieve the other logging events from the circular buffer for processing after the logging control configuration has been fully applied, as indicated by a logging service ready state being enabled;

filter the other logging events based on a severity of individual logging events to provide filtered logging events after the logging control configuration has been fully applied; and replay the filtered logging events by sending the filtered logging events to the syslog daemon for handling thereof after the logging control configuration has been fully applied.

20. The computer program product as recited in claim 19, wherein the period of time of logging control configuration is during start up of the master node controller, wherein the logic is further configured to add all logging events in the circular buffer to a core dump file related to a node controller which issued the logging events when a fatal exception occurs before the global flag is set to true; and wherein the en-queuing all other logging events for later processing comprises writing a final string and syslog message string of each logging event to the shared memory in a portion of the shared memory allocated to a log agent instance for which the logging events pertain.

* * * * *